Figure 1:
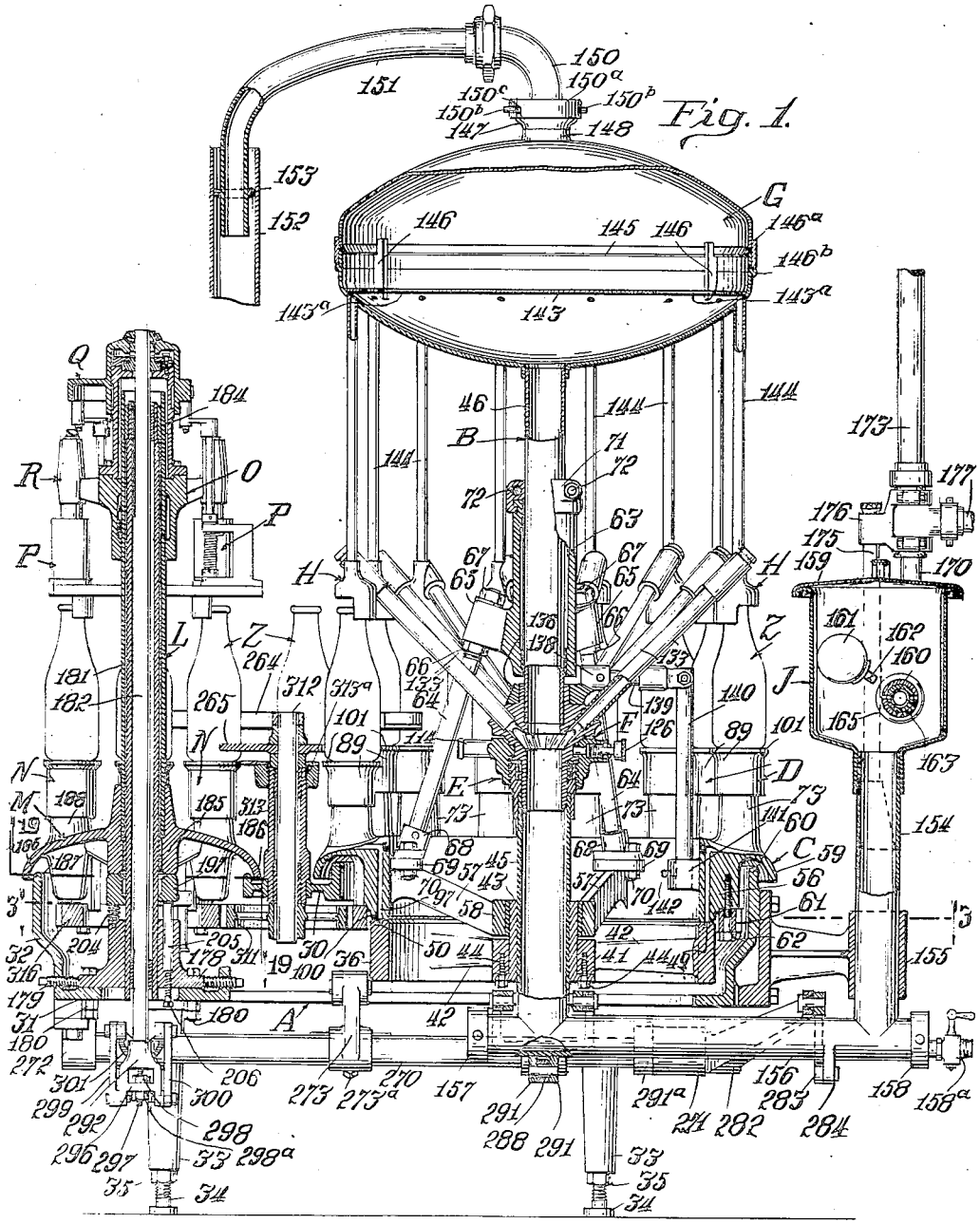

Inventors
Lewis E. Fagan
and Albert B. Mojonnier
By Thomas H. Ferguson
Attorney.

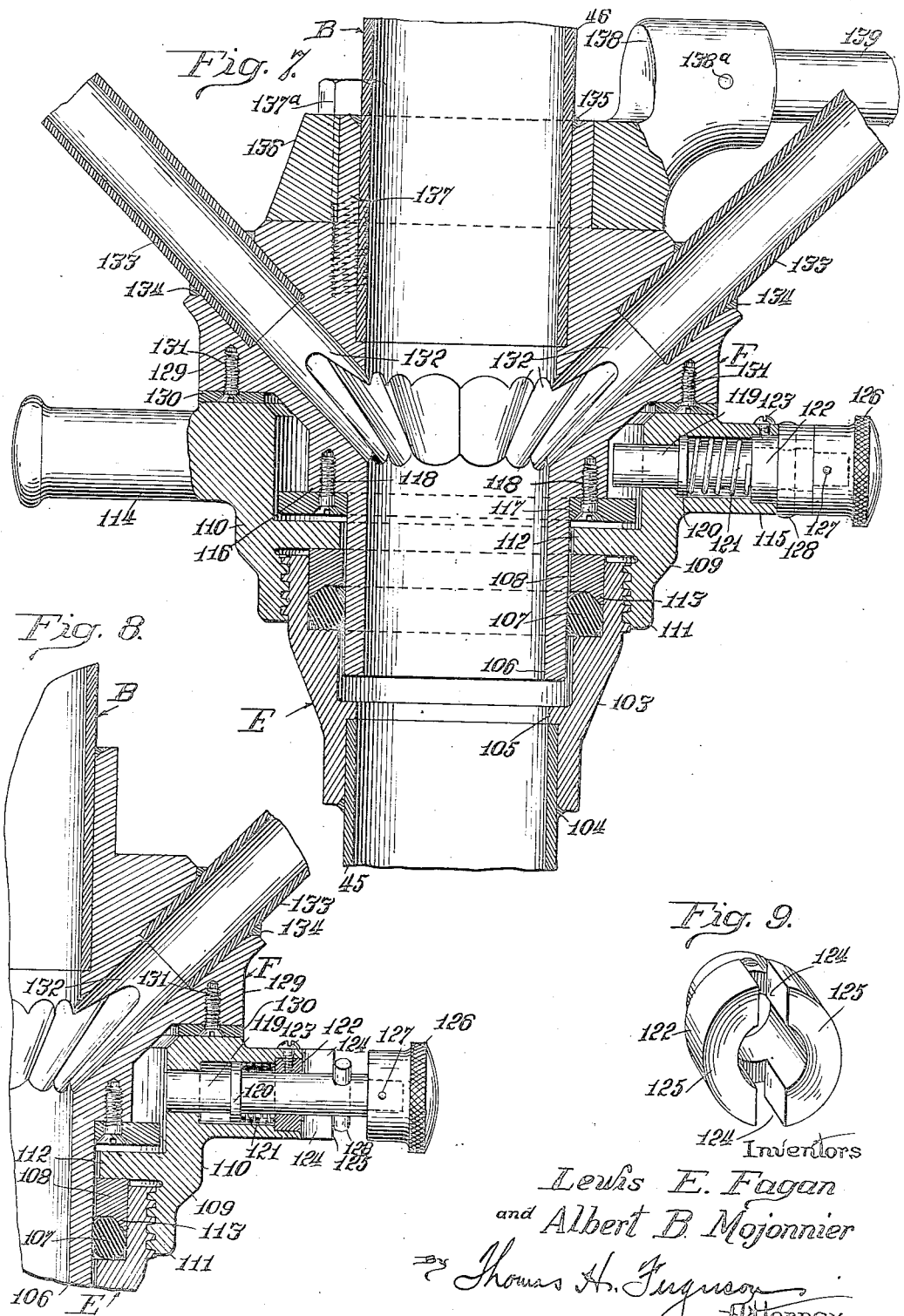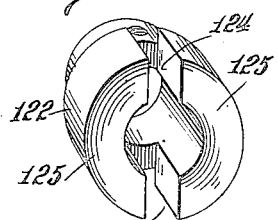

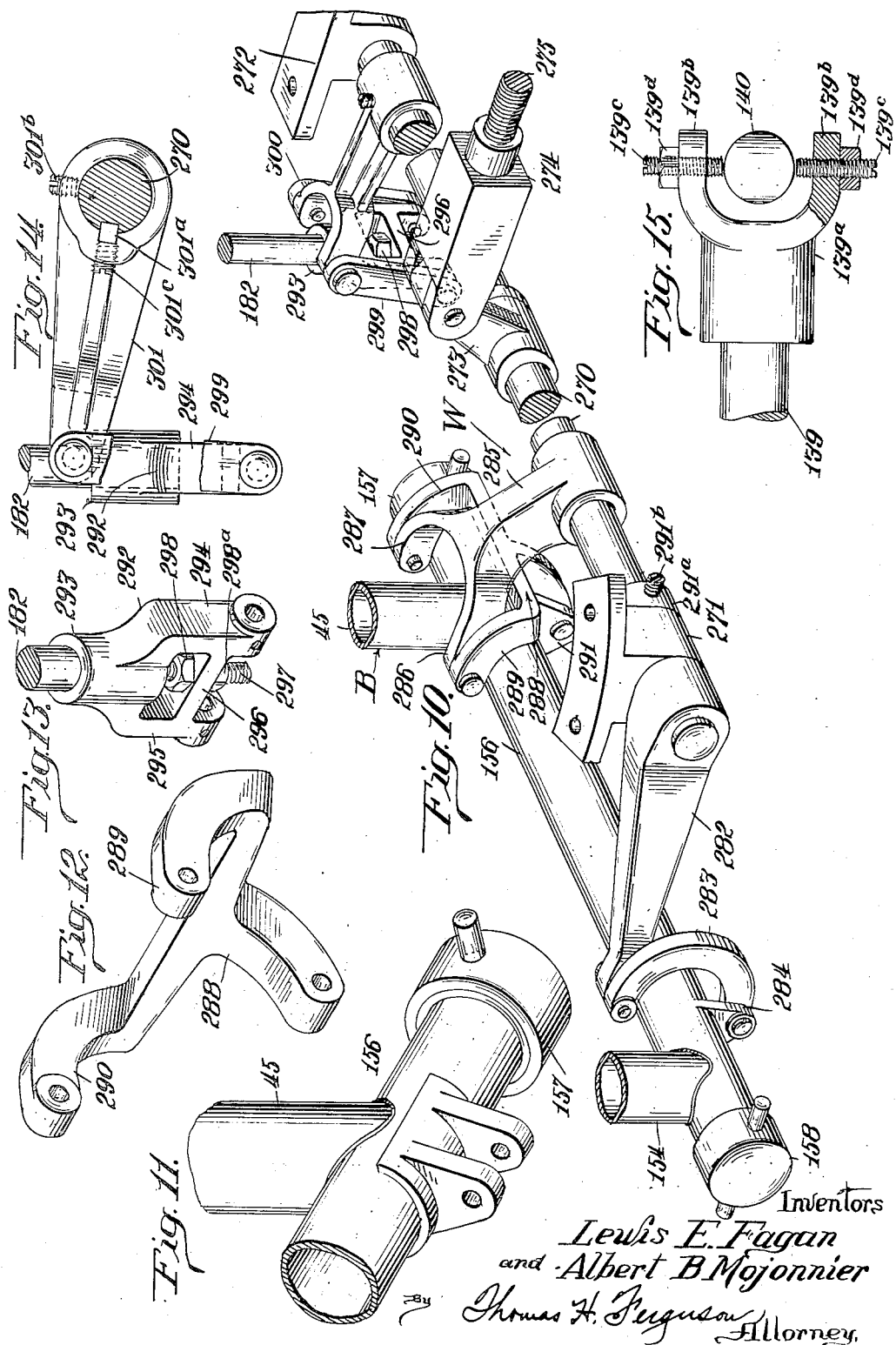

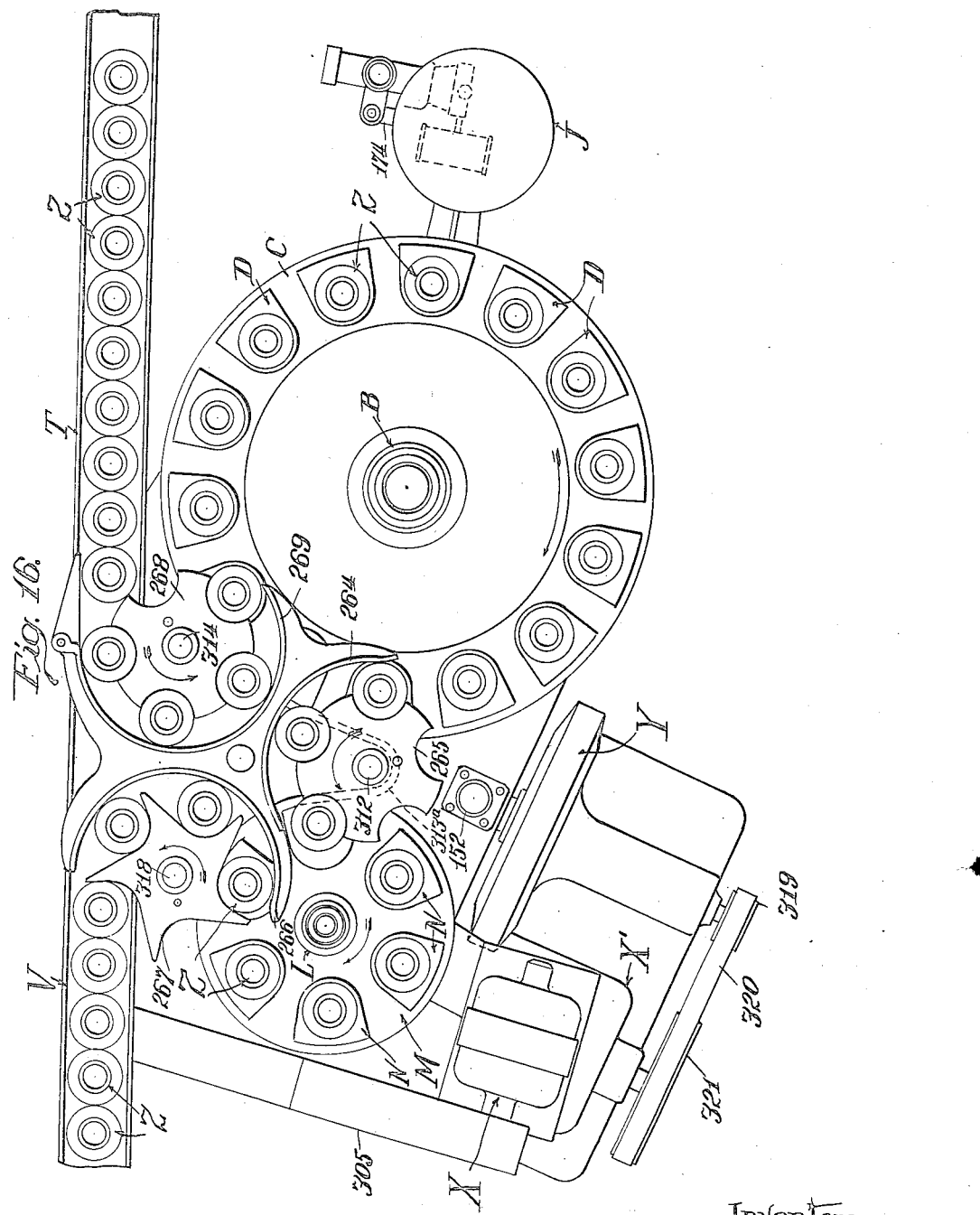

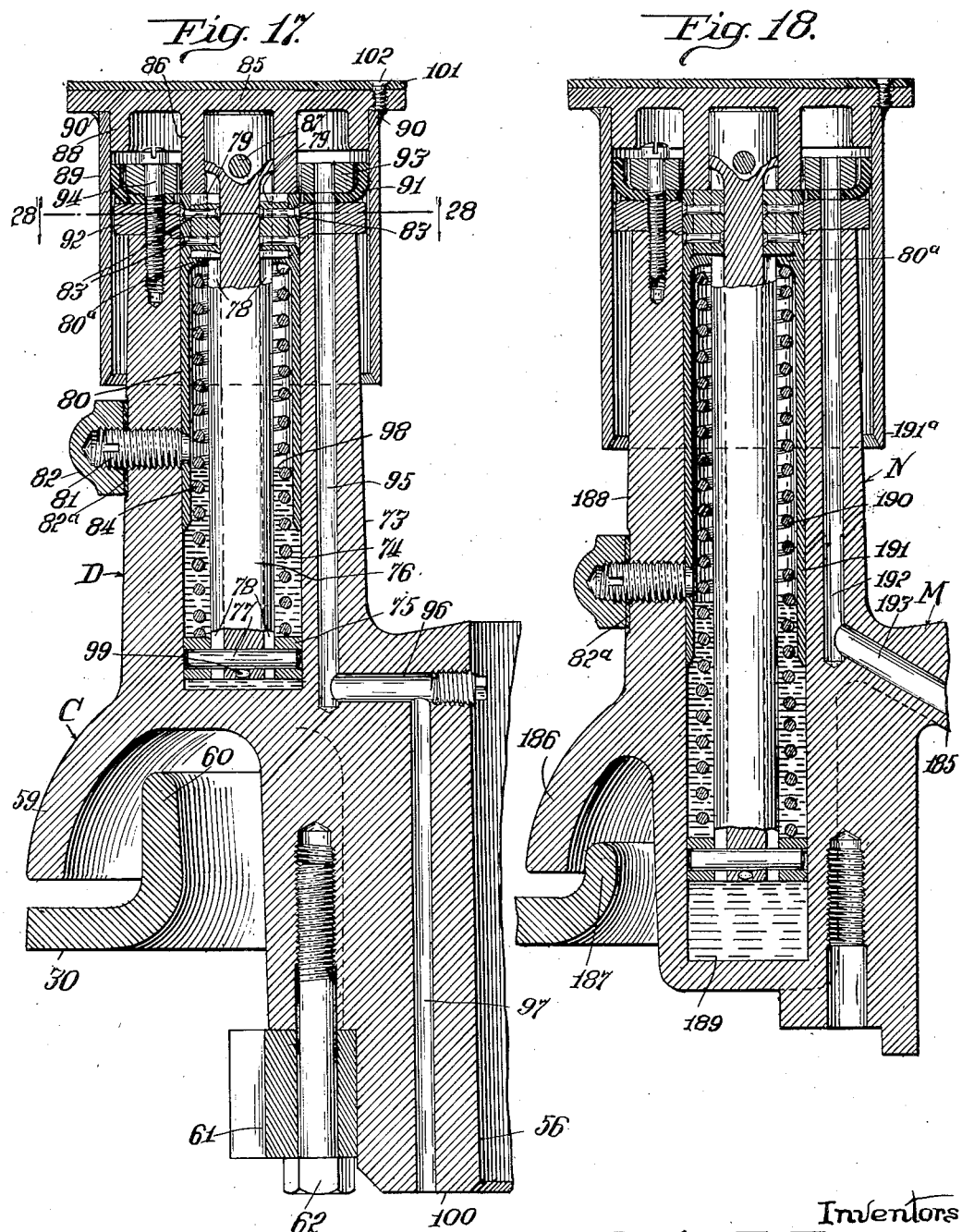

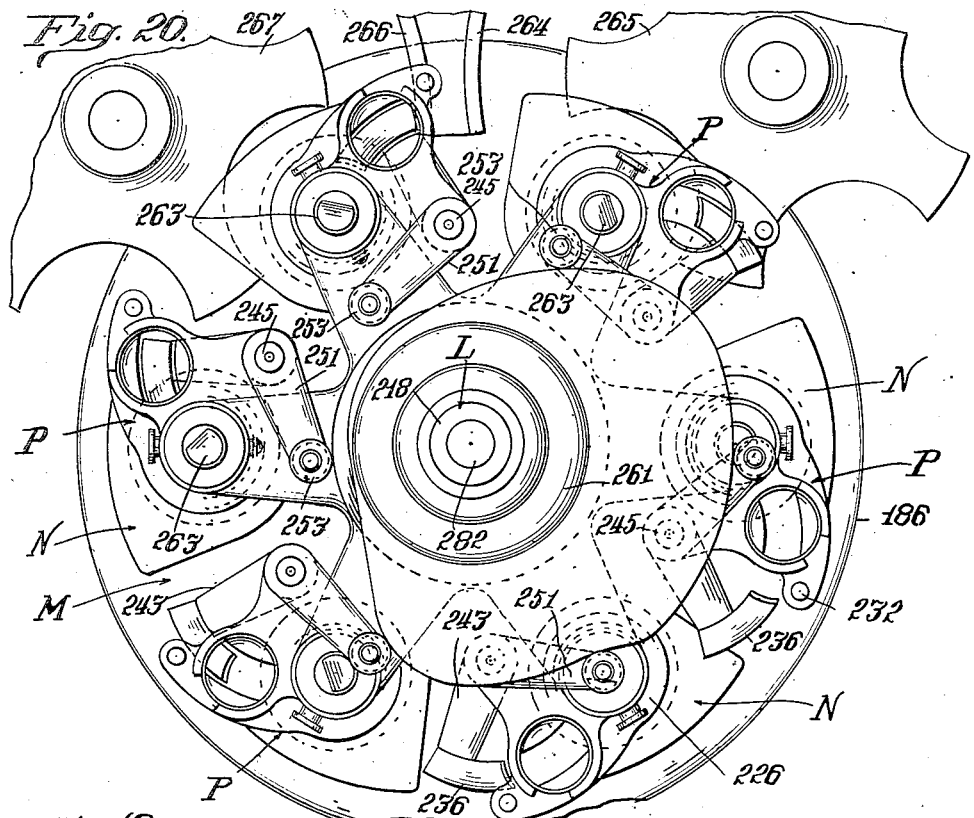
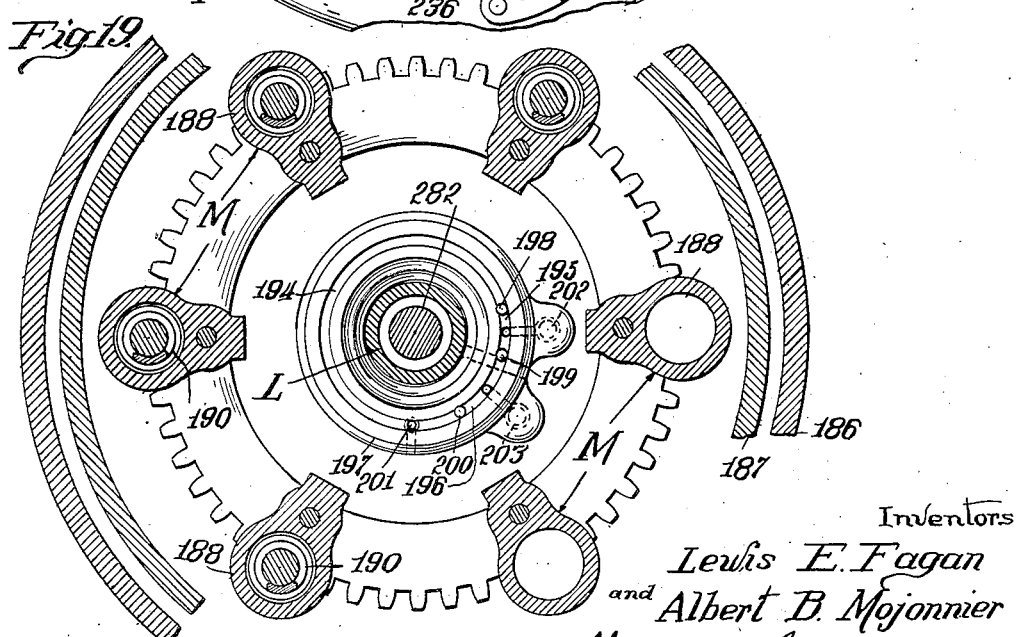

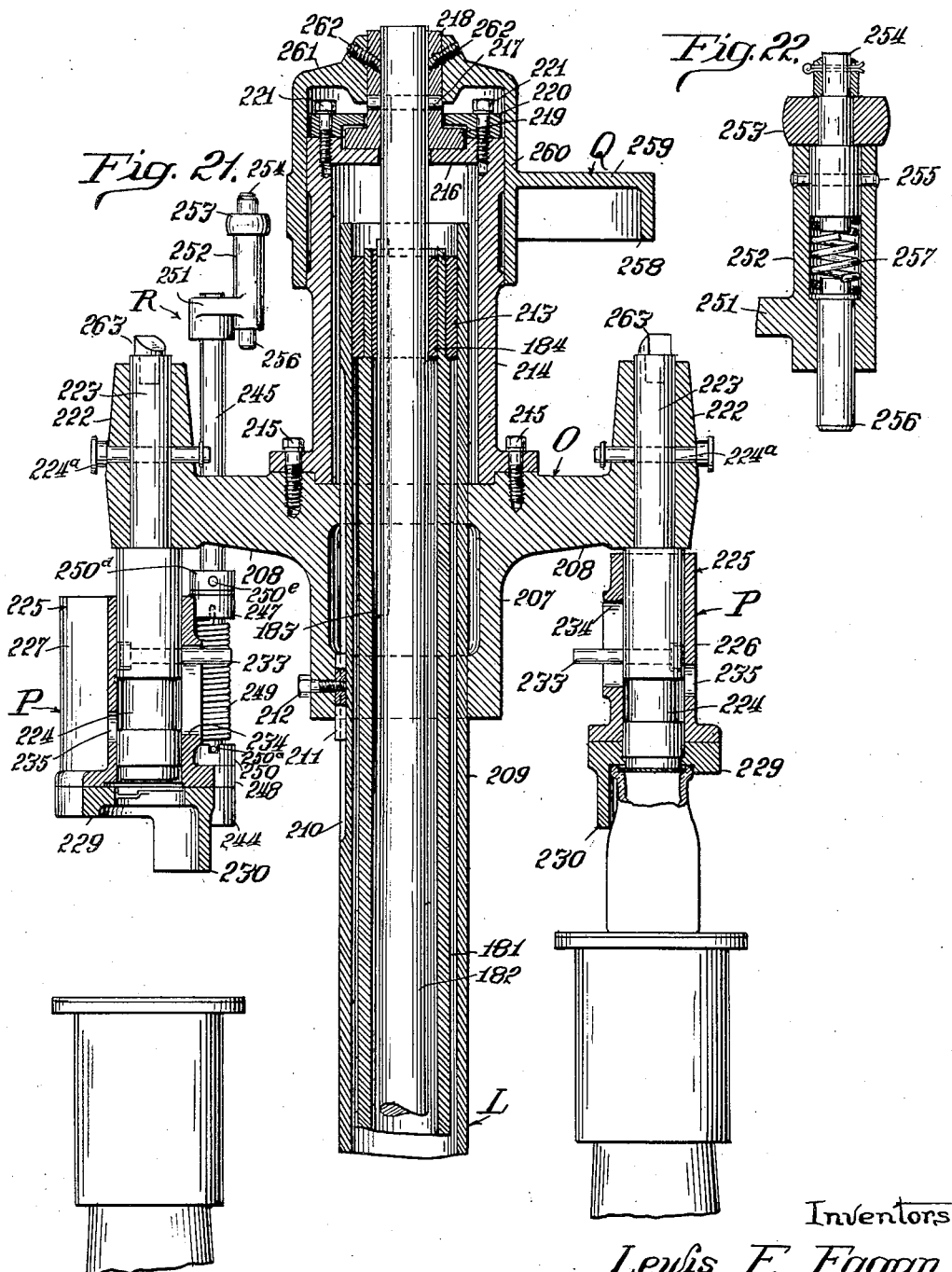

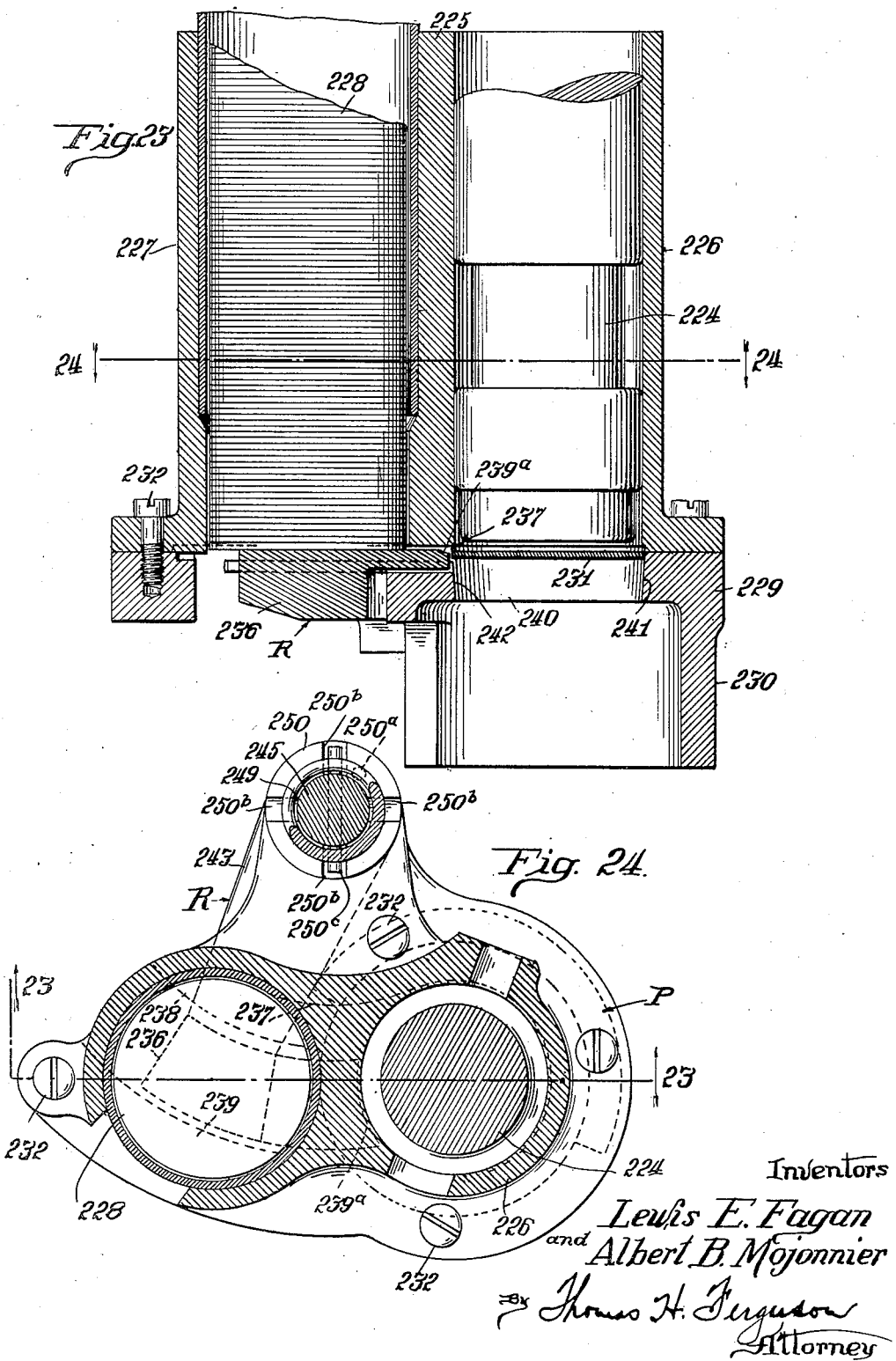

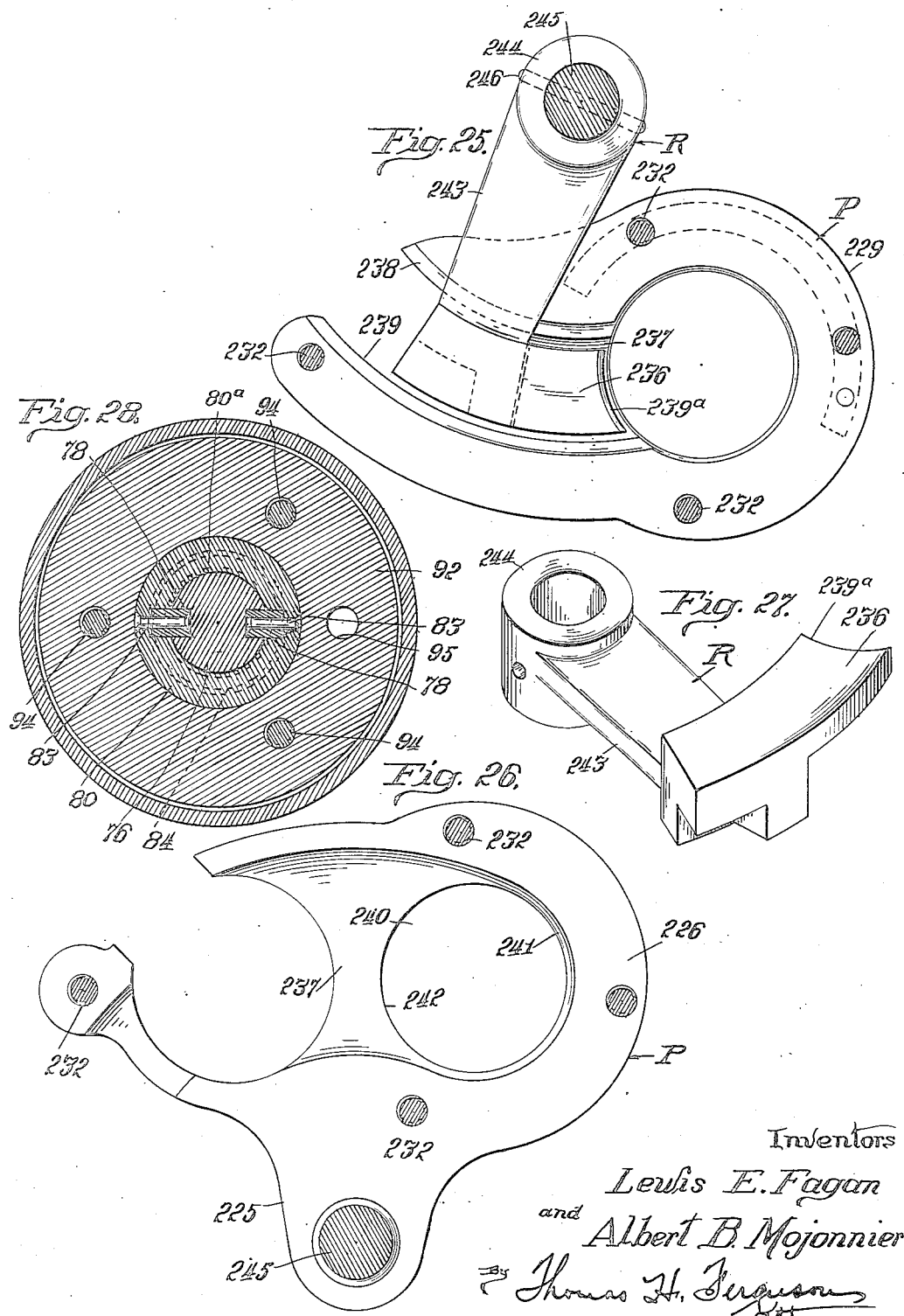

July 17, 1934.    L. E. FAGAN ET AL    1,966,889
BOTTLE FILLING AND CAPPING MACHINE
Filed Nov. 18, 1932    14 Sheets-Sheet 14

Inventors
Lewis E. Fagan
and Albert B. Mojonnier
By Thomas H. Ferguson
Attorney

Patented July 17, 1934

1,966,889

UNITED STATES PATENT OFFICE 1,966,889

BOTTLE FILLING AND CAPPING MACHINE

Lewis E. Fagan, Chicago, and Albert B. Mojonnier, River Forest, Ill., assignors to Mojonnier Bros. Co., a corporation of Illinois Application November 18, 1932, Serial No. 643,132

26 Claims. (Cl. 226—76)

The present invention relates to bottle filling and capping machines, and particularly to an organization in which the filling is done by the employment of a vacuum and the capping is done by mechanism which presses a simple disk down into the top of the bottle.

One object of the invention is to provide a novel arrangement of parts such as to make possible a bodily adjustment of the filler and capper elements as a unit so as to promptly set the bottle engaging elements in proper position for the handling of bottles of different sizes, one adjustment providing for one size and a second adjustment for a second size, and so on.

Another object is to provide a novel liquid supply column for the filling element of the machine, which is composed of a plurality of sections which may be readily separated for cleaning purposes or maintained as a unit for operative adjustment to meet different conditions of service.

In this connection it may be pointed out that the filling element of the machine is constructed along the functional lines of Broadhurst's United States Patent No. 1,665,948, granted April 10, 1928, and certain features of the invention may be considered as direct improvements, both functionally and structurally, upon the disclosures of that patent.

Another object of the invention is to provide for the maintenance of a proper liquid level in the parts of the machine to insure proper filling of the bottles even though the parts be adjusted to different elevations to suit the differently sized bottles. The maintenance of this level in the central tubular column, sometimes called the "barometric column" or "barometric pipe", is of prime importance. In attaining this object of the invention, we employ a liquid supply tank and mount the same so that it will be raised and lowered equally with the tubular column and other parts associated with it. The tank is provided with a float valve which cooperates in maintaining the desired level within narrow limits.

Another object is to provide a novel and efficient bottle lifter both for the filler and capper elements which act effectively in positioning the bottles beneath both their filling and capping heads.

Another object is to provide a filling element such that the liquid supplied to the bottles may be varied to suit bottles of different capacities. This may be a very desirable feature in some instances while in others it may not be objectionable to pass liquid through the bottles of smaller size instead of stopping the filling just at the time, or approximately the time, they are full. Provision is made by our invention for filling in either of these ways.

Other objects and features of the invention are directed to the end of having a high degree of sanitation and involve arrangements of parts for ready disassembly and assembly so that they may be expeditiously and properly cleaned.

These and other objects and features of the invention will be more fully understood upon reference to the following detailed description taken in connection with the accompanying drawings which show a preferred form of the invention embodied in a machine for filling bottles with milk or cream and capping the same.

In this connection, it may be pointed out that the present invention has to do with the general features of the combined filling and capping machine in contrast to the filler head which constitutes the subject matter of Fagan's application Serial No. 614,474, filed May 31, 1932, Patent No. 1,929,736, granted October 10, 1933, and in further contrast to the capping mechanism which constitutes the subject matter of our joint application Serial No. 640,832, filed November 2, 1932. It may also be pointed out that the filler head of the aforesaid Broadhurst Patent No. 1,665,948, may be used upon the machine herein disclosed, but that the specific construction of the aforesaid Fagan application Serial No. 614,474, is preferred.

Figure 2:
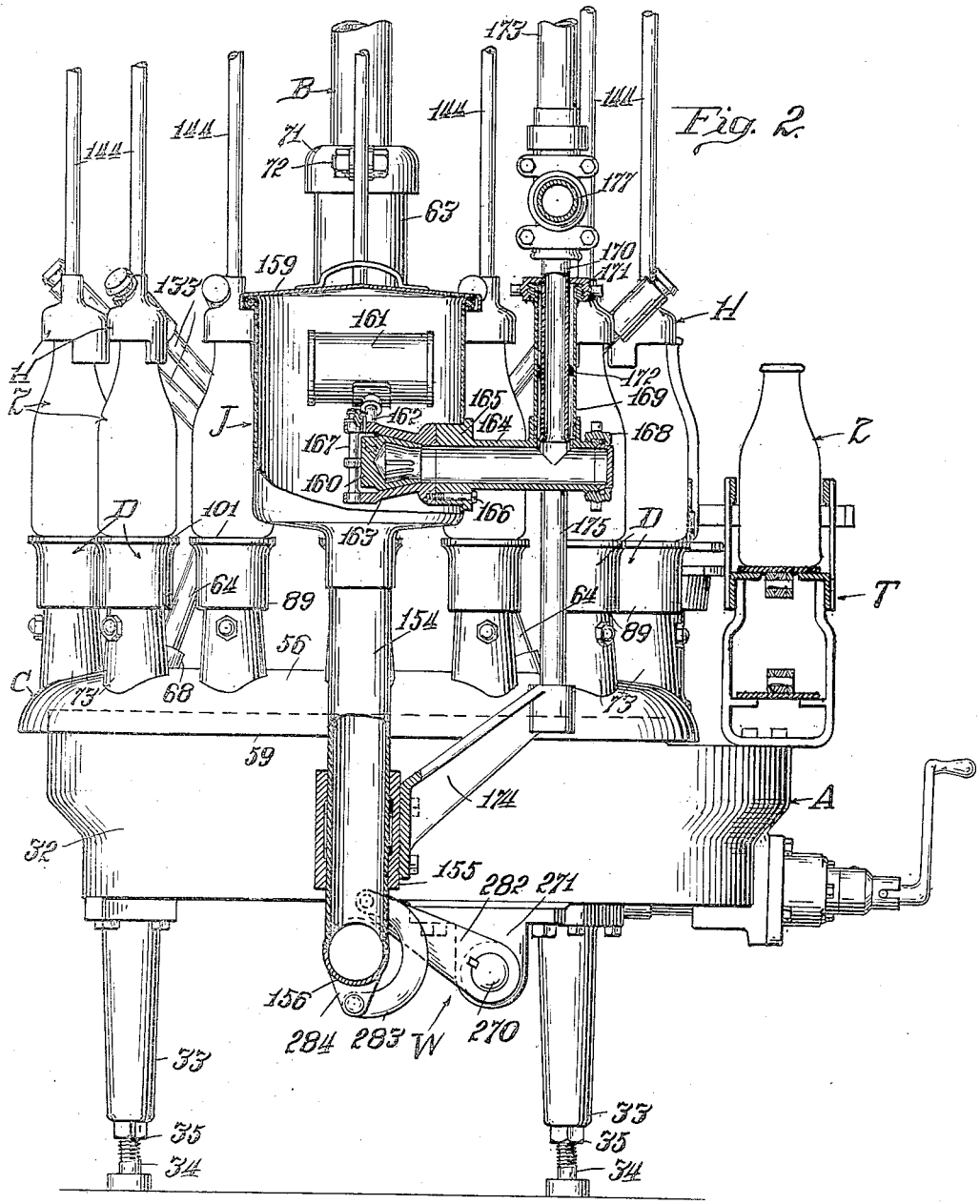
Figure 3:
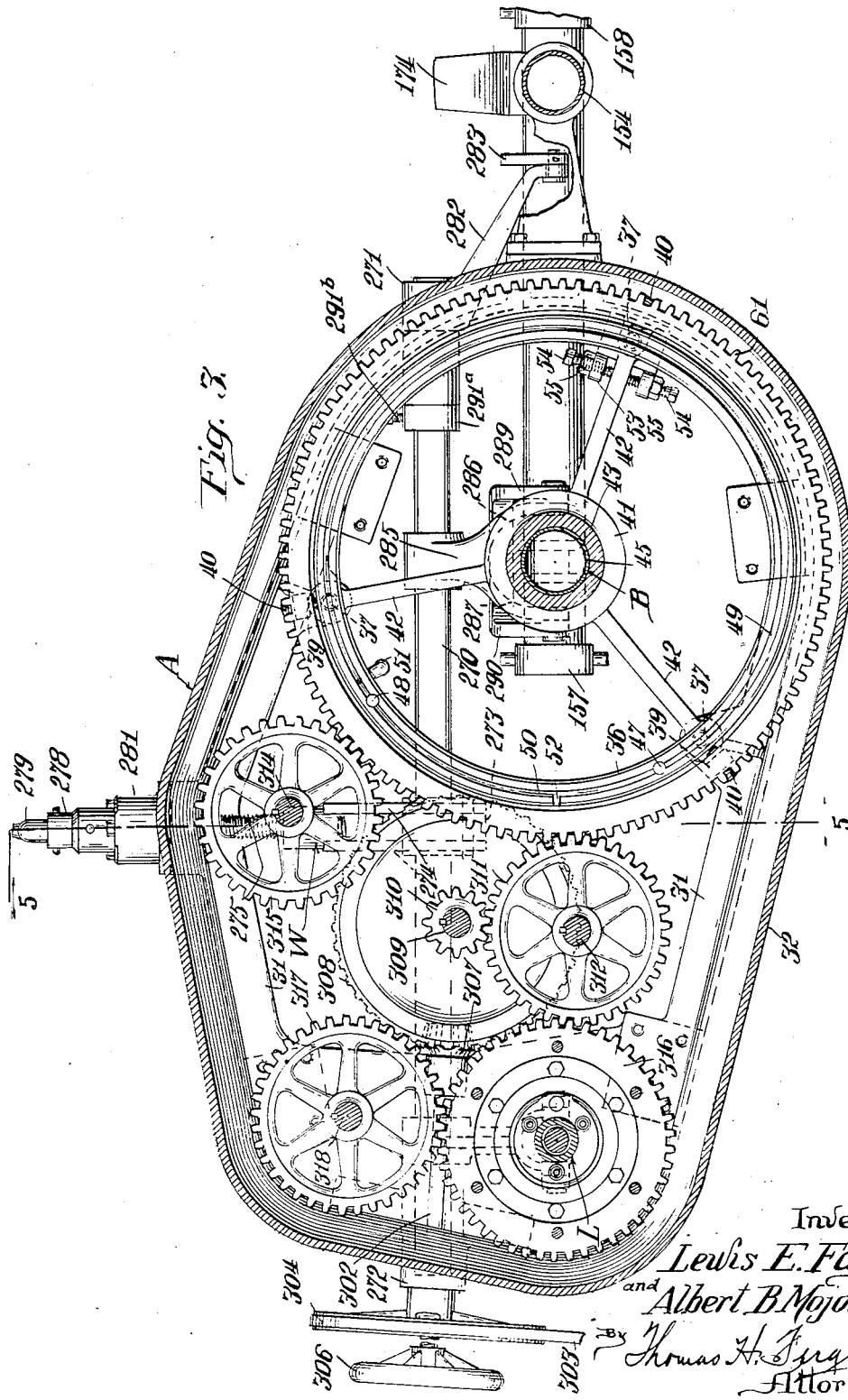
Figure 4:
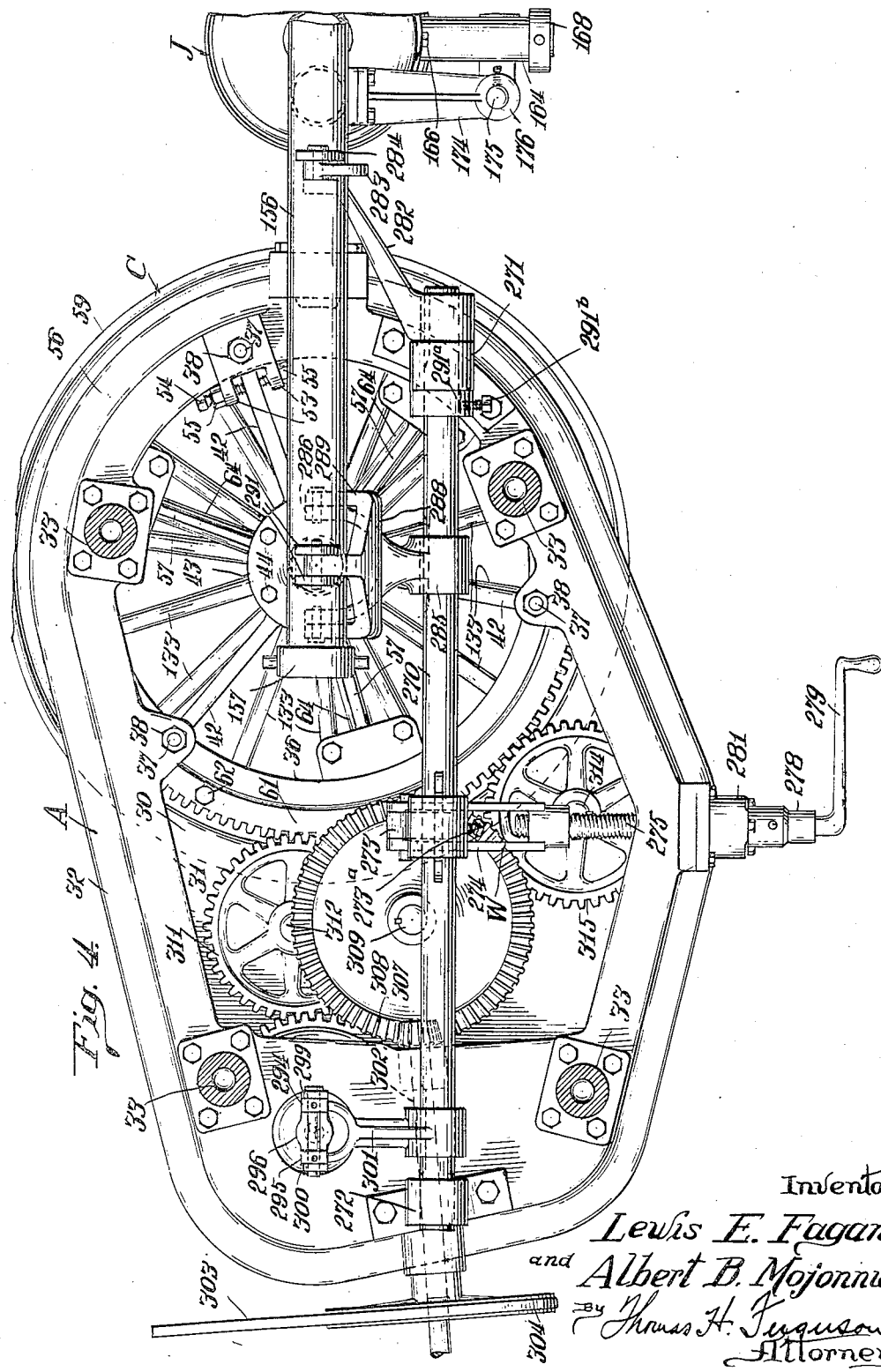
Figure 5:
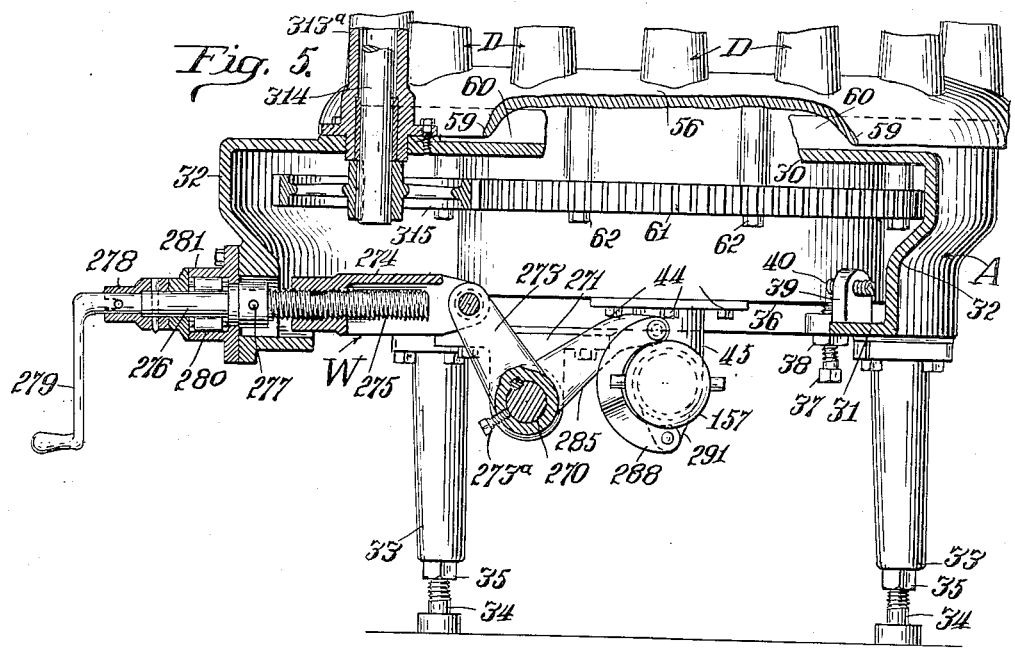
Figure 6:
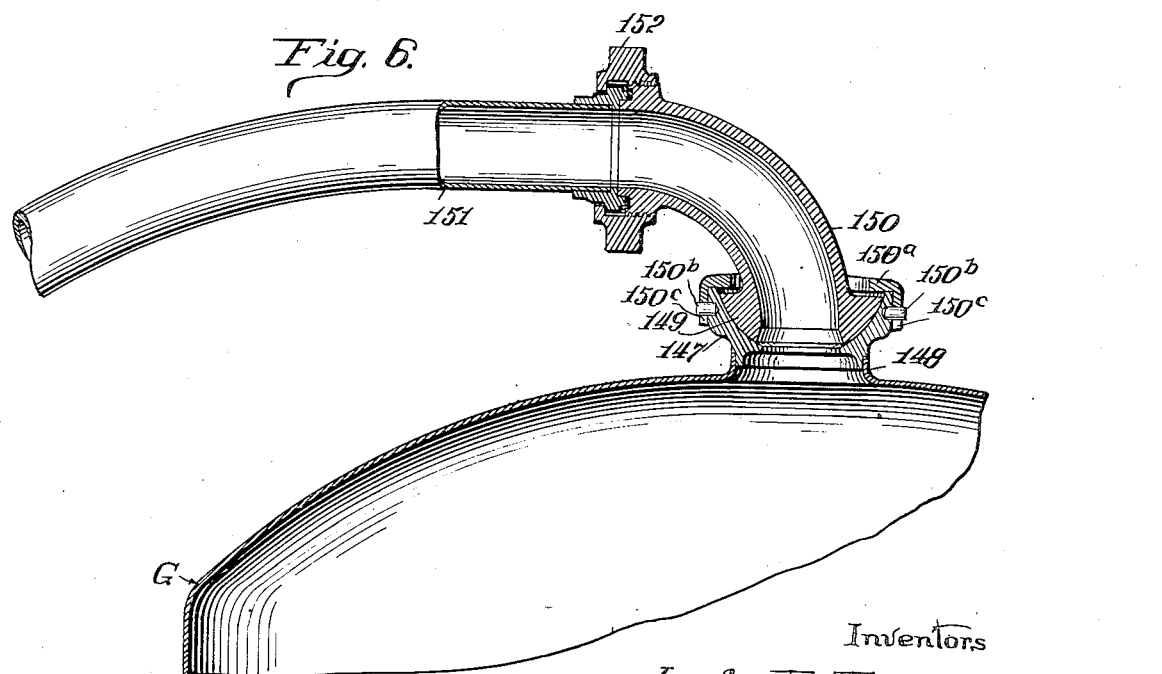
Figure 29:
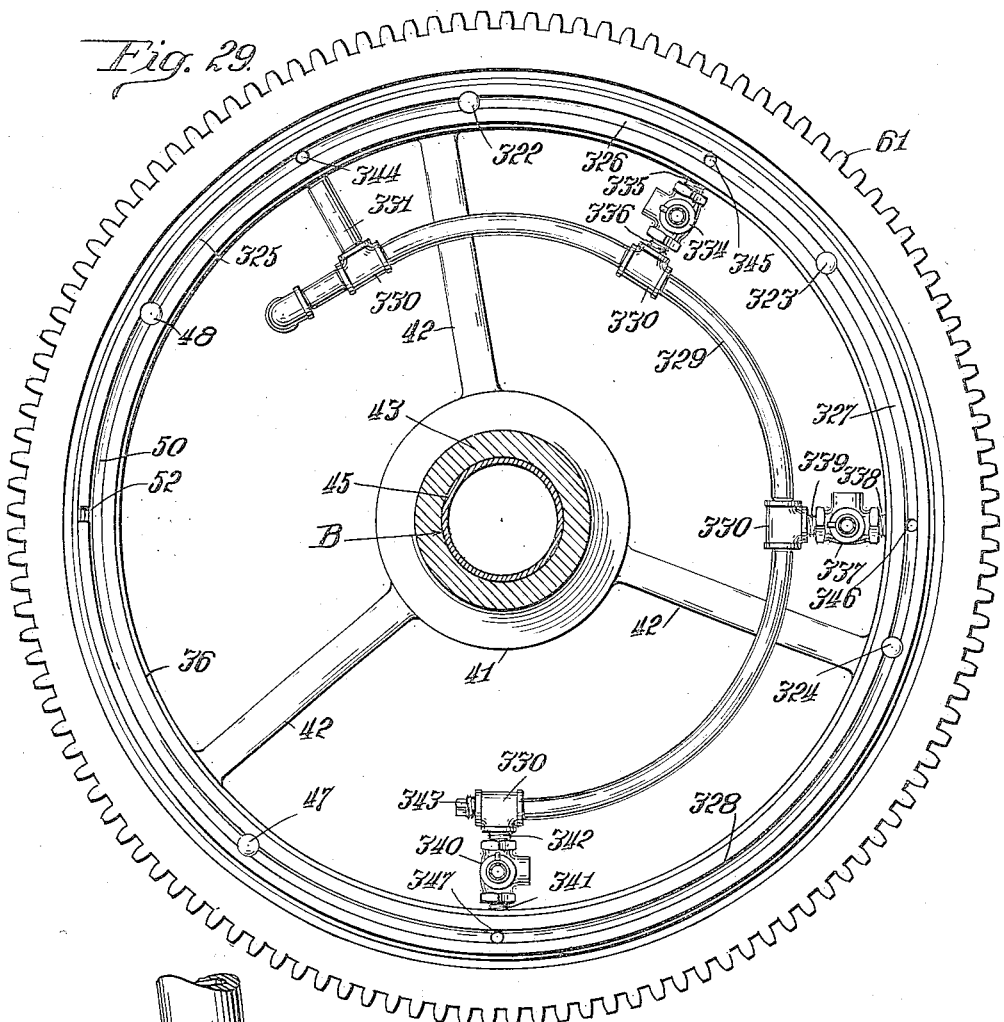
Figure 30:
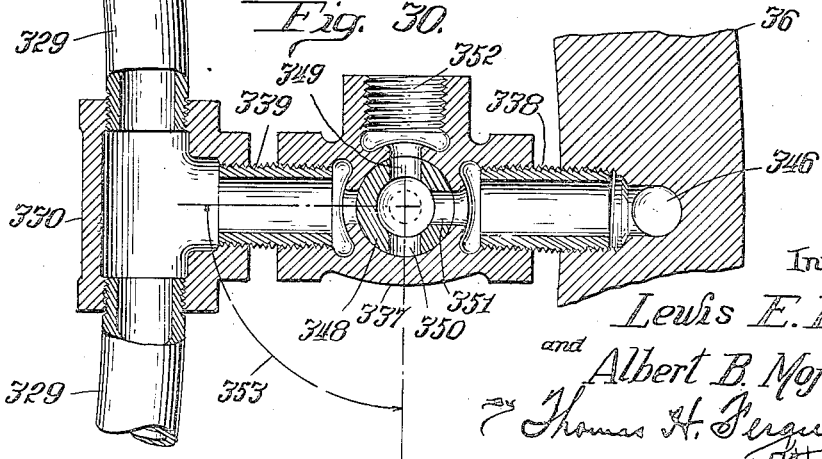

In said drawings, Fig. 1 is a front elevation of a machine constructed and arranged in accordance with the present invention, certain of the parts being shown in central vertical section, the plane of section extending through the axes of the filler and capper elements of the machine; Fig. 2 is an end elevation of the machine viewed from the supply tank end, certain portions again being shown in vertical section; Fig. 3 is a horizontal section taken near the bottom of the machine and showing more particularly the gearing and the air channels associated with the filling element, the plane of section being approximately that indicated by the line 3—3 of Fig. 1; Fig. 4 is a bottom plan view of the machine, the legs only being shown in section; Fig. 5 is a partially sectional view illustrating particularly the adjusting mechanism by which certain filler and capper elements are raised and lowered to suit the handling of differently sized bottles, the plane of section being in general that indicated by the line 5—5 of Fig. 3; Fig. 6 is a partially sectional view of the intercepting chamber and the associated exhaust connection through which air is withdrawn from the chamber; Fig. 7 is a central vertical section of the associated bearing and hub which unite the upper and lower sections of the central tubular column of the filling element, the hub and upper section being freely rotatable upon the bearing and lower section which is fixed against rotation; Fig. 8 is a similar view of a portion of the same, illustrating the latch pin, by which the hub is secured to the bearing, withdrawn so as to allow the tubular sections of the column to be separated for cleaning purposes; Fig. 9 is a perspective view of a portion of the latch mechanism; Fig. 10 is a perspective view of a rock shaft and associated parts by which the supply tank and tubular column of the filler element and an adjusting rod of the capper element are raised and lowered to suit the machine to the handling of bottles of different sizes, the parts shown being located near the bottom of the machine; Fig. 11 is a perspective view illustrating one end of the inter-connecting pipe which forms part of this same mechanism and which unites the tubular column of the filler with the associated liquid supply tank; Fig. 12 is a perspective view of one of the link members by which a crank arm on the rock shaft is connected to the interconnecting pipe mentioned; Fig. 13 is a perspective view of a connecting member at the lower end of the rod by which the capper head is adjusted; Fig. 14 is a side elevation of the connection between the member of Fig. 13 and the associated rock shaft; Fig. 15 is a detail view illustrating the manner of connecting a coupling rod and post which unite the carrier of the filler to its central hub; Fig. 16 is a diagrammatic view illustrating in plan the path of travel of the bottles from a feeding in conveyer through the machine to a delivery conveyer; Fig. 17 is a central vertical section through one of the bottle supports or lifters of the filling element of the machine; Fig. 18 is a similar view of a support or lifter of the capper element of the machine; Fig. 19 is a sectional view showing the operating air channels or grooves through which air is supplied for the operation of the capper lifters, the plane of section being indicated generally by the line 19—19 of Fig. 1; Fig. 20 is a plan view of the upper portion of the capper structure illustrating the operating cam and associated capper actuating mechanisms; Fig. 21 is a vertical section on a large scale of the upper portion of the capper illustrating particularly the capper heads and the actuating mechanism associated therewith; Fig. 22 is a vertical section through a capper cam-engaging arm at the upper end of the rock shaft forming part of each of cap positioning mechanism; Fig. 23 is a vertical section through the capping magazine and associated plunger chamber and capper head, the plunger being shown in elevation and the plane of section being that indicated by the line 23—23 of Fig. 24; Fig. 24 is a horizontal section through the same parts, the plane of section being indicated by the line 24—24 of Fig. 23; Fig. 25 is a plan view of the capper head and associated feeding blade by which the cap is thrust above the bottle beneath the plunger; Fig. 26 is a bottom plan view of the cap magazine and the plunger chamber and, as obvious, this part fits directly upon the parts shown in Fig. 25; Fig. 27 is a perspective view of the cap feeding blade shown in plan in Fig. 25; Fig. 28 is a sectional view through one of the bottle lifters, the plane of section being indicated by the line 28—28 of Fig. 17; Fig. 29 is a plan view of the filler base similar to that shown in Fig. 3 but modified to provide for varying degrees of travel during which liquid is being filled into the bottles; and Fig. 30 is a horizontal sectional view through one of the three-way valves and associated connections shown in Fig. 29. Throughout these views like characters refer to like parts.

In order to obtain a general understanding of the machine, the essential elements will be briefly pointed out. Then, later on, these parts will be more fully described. As previously indicated, the machine comprises a filling element and a capping element. These are both mounted upon a base A. The filling element includes the tubular "barometric" column B, a bottle carrier C, bottle supports D located upon said carrier, the bearing E at the upper end of the lower section of the central column, the hub F which cooperates with the bearing E in the rotation of the parts and in maintaining the continuity of the central column, the intercepting chamber G, and the filler heads H. The capper element, on the other hand, includes the tubular standard L, the carrier M mounted to rotate about said standard, the bottle supports N spaced around the periphery of said carrier, the supporting head O located at the upper end of the standard, the capper heads P carried by the supporting head, the cam Q at the upper end of the standard, and the operating mechanisms R by which the requisite movements are brought about in applying the caps. In addition to the filling and capping elements, we have the conveyer T by which the bottles are brought to the machine, and the outgoing conveyer V which carries them from the machine. Furthermore, there is the adjusting mechanism W by which certain of the filler and capper parts are raised and lowered to suit the machine to bottles of different sizes, and there are the driving motors X, X' and the associated suction pump Y. And in many of the views are to be seen the bottles Z which the machine fills and caps.

The base A is, in the present instance, a casting of fairly regular outline provided with an upper floor 30 and a lower flange 31, both of which extend inwardly from a more or less vertical peripheral web 32. The floor 30 extends over the entire extent of the base except where it lies directly beneath the filling and capping elements. At those points it is provided with circular openings for the reception of rotary and other parts of these elements. The flange 31 on the contrary extends only a short distance inward of the peripheral web 32 except at the capper end of the base where it extends inward somewhat farther, as clearly shown at the left in Fig. 3. The particular arrangement of these various base parts is not a matter of great importance since different designers might prefer quite different arrangements.

This base, or frame, as it might equally well be termed, is provided, in the present instance, with four legs 33 which are suitably secured to the lower flange 31 and provided at their lower ends with adjustable leveling screws 34 threaded into nuts 35 secured to the bottoms of the legs. By the use of the screws 34, which in reality constitute adjustable feet, the frame may be readily adjusted to suit irregularities in the floor or foundation upon which the machine is positioned. As clearly shown, a pair of these legs is located at the filler end of the frame or base, and the other pair is located at the capper end of the same.

When it comes to the filling element of the machine, a supporting ring 36 is provided at the wider end of the base A and this ring rests upon the ends of machine bolts 37 which pass through the lower flange 31 of the base. In the present instance three bolts 37 are employed and they pass through openings in the flange 31, which is widened at two points for this purpose. Since the ring has a three point suspension, it is possible by proper adjustment of the machine bolts 37 to accurately level the ring. When in properly adjusted position, the bolts 37 may be held by lock nuts 38 which bear against the under side of the flange 31 of the base A.

In order to properly center the ring 36, the flange 31 is provided with suitable upwardly extending lugs 39 which lie just outward of the ring 36 and are provided with adjusting screws 40 which are threaded through openings in the lugs and press at their inner end against the ring 36. Preferably there are three such lugs and screws.

The ring is connected to a central hub 41 by a plurality of spokes 42. The hub 41, in turn, is provided with a sleeve bearing 43 which is secured in place by machine screws 44 extending through a lower flange on the member 43. The bearing member 43 provides a tubular bearing for the lower section 45 of the tubular column B, the upper portion of the latter being the similar tubular section 46.

As shown more particularly in Fig. 3, the upper edge of the ring 36 is provided with a continuous groove which is divided by plugs 47 and 48 into two sections 49 and 50. These separated sections constitute chambers or passages for the applications of air under pressure to the bottle supports or lifters D to cause them to raise and lower the bottle at proper points in their rotation about the central column B. In the present instance, the passage 49 is connected with a source of supply of compressed air through the tubular connection 51, while the passage 50 is connected directly to atmosphere through a port 52. This means that whenever a lifter is above the passage 49, it is raised by the compressed air which is supplied through that passage; and whenever it passes into a position above the passage 50, then such air as has been used in raising it is exhausted to atmosphere through the port 52. Because of the importance of having these channels 49 and 50 properly positioned with reference to the cooperating parts, in order to obtain proper operation, some provision must be made for an accurate rotary adjustment of the ring 36 about the central column B.

To provide for such rotary adjustment, the lower flange 31 of the base A is provided with a pair of lugs 53 which lie on opposite sides of one of the spokes 42. Through threaded openings in these lugs 53, oppositely positioned screws 54 extend and are brought into engagement with opposite sides of the interposed spoke 42. By screwing down on one bolt and unscrewing the other, an accurate positioning of the spoke 42 and, therefore, an accurate positioning of the ring 36 may be obtained with reference to the base A. When the ring has been once set in position, then lock nuts 55 upon the screws 54 may be turned down against the lugs 53 to hold the screws against dislodgement.

The bottle carrier C is also a ring-like member having an annular body 56 connected by spokes 57 to a central hub 58 which is journaled upon the outside of the bearing member 43. The annular body 56 of the carrier C has an outwardly and downwardly extending flange 59, which incloses the upwardly extending rim or flange 60 on the base A. This flange surrounds the opening in the plate 32 of the base in which the carrier is positioned. As clearly shown, the lower face of the carrier has a toothed ring 61 attached to it by suitable means such as the machine bolts 62. This toothed ring when mounted on the carrier constitutes a gear wheel by which the carrier is located through the agency of gearing which will be more fully pointed out hereafter.

Besides having the hub 58 journaled upon the central column, the carrier also has an upper sleeve 63 which surrounds the upper section 46 of the central column B. This sleeve member is connected by a plurality of rods 64, preferably three in number, which extends as the legs of a tripod downward from the bearing 63 to the main portion of the carrier, as clearly illustrated in Fig. 1. These rods 64 are preferably passed through openings in the bosses 65 which extend outwardly from the sleeve 63. Suitable nuts 66 and 67 serve to hold the upper ends of the rods to the bosses. The lower ends of the rods are passed into sockets 68 which are secured to inward lugs or flanges 69 carried by the annular body 56 of the carrier. Suitable bolts and nuts 70 serve to secure the sockets to the flanges. A split cap 71 at the top of the sleeve 63 has its parts united by suitable bolts and nuts 72 to form a tight fit between the column section 46 and the sleeve 63. It may be mentioned at this point that when the carrier C rotates, it carries with it the sleeve 63 and the upper section 46 of the column, as well as all parts which are connected to that section.

The carrier C is also provided with the supports D which in this embodiment takes the form of lifters for raising the bottles Z into engagement with the filling heads H. The structure of one of these lifters is clearly illustrated in Figs. 17 and 27. As there shown, the annular body 56 of the carrier is provided with a series of posts 73, and each of these posts with the parts carried by it constitutes a complete lifter construction.

Referring particularly to Figs. 17 and 27, it will be seen that the post 73 is bored out at its center to provide a chamber or well 74. In this chamber a dash pot piston 75 is adapted to travel. This piston is carried at the lower end of a piston rod 76, the piston and rod being secured together by a transverse pin 77. The rod 76 is provided with oppositely disposed grooves 78 which cooperate with the keys 79 in guiding the rod 76 and prevents rotation of the latter. The keys 79 are secured on the inner side of the upper end of a tubular sleeve 80 which fits down into the well 74 in the post 73. The sleeve 80 is secured against removal by a set screw 81 which is preferably covered by a cap nut 82 fitting down upon a gasket 82ª when in securing position. As clearly shown, the inner end of the screw 81 enters an opening in the wall of the sleeve 80. The keys 79 are narrow blocks which are secured to the sleeve 80 by any suitable means such as the rivets 83. In the specific construction shown, the upper end of the tubular sleeve 80 is provided with a thickened portion or ledge 80ª which extends inward and forms an overhanging abutment. This ledge is slotted for receipt of the keys 79 and the latter are held in place by the rivets 83 as just noted.

With this construction, it will be seen that when the sleeve 80 is in place in the bore in the post 73, and the keys 79 enter the slots 78, then the piston rod 76 will be free to move up and down but will be held against rotation by the keys 79 in the slots 78. A coiled compression spring 84 acts between the upper side of the piston 75 and the under side of the overhanging abutment 80ᵃ, and since the sleeve 80 is fixed to the post 73 by the screw 81, the action of the spring is to hold the piston 75 normally in the bottom of the well 74. The upper end of the piston 76 is secured to the lifter head 85. The latter is preferably provided with a tubular sleeve 86 at its center into which the end of the rod 76 enters and to which it is secured by a transverse pin 87. The head 85 also carries near its periphery another annular flange 88 to which the skirt 89 of the lifter is suitably secured as by soldering, indicated at the points 90. The skirt 89 is in fact a cylindrical wall which passes down over the outside of the post 73. The upper end of the post is provided with suitable packing in the form of a cup leather 91 which is secured between retaining rings 92 and 93 by a plurality of machine screws 94 which pass down through the rings and intervening leather into threaded engagement with tapped openings in the upper end of the post 73.

The packing 91 thus provides a reasonably air-tight connection and compressed air which is admitted through the tubular passages 95, 96 and 97 will be retained within the space above the packing 91 and beneath the head 85, and by its force press the head 85 upward against the downward pressure exerted by the spring 84. When the compressed air is no longer supplied but the passage 97 is open to atmosphere, then the air will pass out of the chamber beneath the lifter head 85 and the latter will be returned to its normal position by the spring 84. In order to suitably retard the return of the spring, the well 74 is partially filled with oil or other liquid which normally rests approximately at the level indicated at 98. The upward movement of the lifter head will be retarded by the spring 84 and the oil contained in the well 74. Likewise, when the return movement of the head occurs under the downward pressure of the spring 84, the retarding effect of the oil in the well will also be brought into service. As the piston 75 passes up or down the oil will find its way past the piston both through the openings 99 through the piston and to some extent through the space around its periphery between it and the associated cylindrical wall. In other words, the lifter head is raised by compressed air and lowered by gravity and spring pressure, the oil meanwhile retarding the movement in both directions. In this connection it may be pointed out that the lower end of the passage 97 terminates in a port in the annular face 100 on the under side of the carrier C.

As illustrated more particularly in Fig. 1, the annular face 100 registers with the grooved bearing face of the bearing ring 36 of the filler. This means that as the lifters are rotated by the travel of the carrier over the fixed ring 36, the port at the lower end of each passage 97 will be brought during a considerable portion of the rotation into communication with the compressed air supply furnished through the connection 51 and the groove section 49. During this portion of the travel the heads 85 will be thrust upward and maintained in their uppermost position. However, as soon as the port at the lower end of the passage 97 passes into engagement with the sectional groove 50, the air previously supplied to the under side of the head will be exhausted to atmosphere through the port 52. This will mean that the head of the lifter will return to normal position and remain there throughout the passage of the lifter between the plugs 47 and 48 which divide the groove into the sections 49 and 50. The upper surface of the head 85 is provided with a wear plate 101 which is secured to the head by suitable screws 102. As these plates become worn, they are replaced so as to maintain accuracy of adjustment with reference to the shifting of the bottles into proper filling engagement with the filler heads H.

Passing now to a consideration of the parts by which the lower section 45 and the upper section 46 of the central column B are united and the latter finds bearing for its rotation with respect to the former, it will be observed that the bearing member E, illustrated more particularly in Fig. 7, includes a tubular sleeve 103 which is bored out at its under side to receive the upper end of the tubular section 45. The bearing member 103 is a casting and is preferably secured to the tube 45 by solder 104. The inner end of the tube also preferably abuts against a rim 105 which has an inner diameter equal to that of the inner diameter of the member 45, thus providing a continuous passage of constant diameter, a point of importance in equipment of this kind where it is necessary to clean the parts frequently. Just upward of the rim 105, the member 103 is bored out with a bore of somewhat larger diameter and in this bore the lower end 106 of the hub member F is adapted to pass.

Again, at a point still further upward the member 103 is bored out to form a packing space in which the packing member 107, in the form of a rubber ring of substantially circular cross-section, is located. A follower ring 108 occupies the space above the packing ring 107 and is adapted to be pressed downward upon the latter to force it into close engagement with the exterior of the tubular portion 106 of the hub F. The outer portion of the member 103 near its top is threaded for the reception of the complementary bearing member 109, the two constituting the complete bearing E. The latter has an annular body 110 from the under side of which extends an annular flange 111 which is threaded on its inner surface to cooperate with the threads upon the member 103. The bearing member 109 also has an inwardly extending flange 112 which is located just upward of its threaded flange 111 and extends inward far enough to engage the upper surface of the follower ring 108. And when speaking of the ring 108, it should be noted that the under surface of the ring has an annular angular projection 113 which extends down around the outer wall of the packing space and exerts special force against the packing ring to bring the latter into close engagement with the end 106 of the hub. This annular angular projection on the ring 108 has been found especially beneficial in maintaining a tight joint where milk has been the liquid handled by the machine. As clearly shown, the member 109 can be threaded more or less completely upon the lower member 103, and thus more or less pressure can be applied to the follower ring 108.

For convenience in turning down the member 109 on the member 103, the former is provided with a rigid handle 114 on the one side, and a stem 115 on the other, which is provided with latch mechanism which is shaped to conform in general to the handle 114 and thus serve as a handle on the other side of the member 109. It will be seen that the hub F carries at an intermediate point a projecting portion 116 which has a flat under face to which is secured a ring 117 which serves as a flange extending outwardly from that portion of the hub. Screws 118 are preferably used to secure the ring 117 in place.

The projecting flange furnished by the ring 117 cooperates with a latch pin 119 which is positioned for reciprocation in a central bore formed in the stem 115. As clearly shown, the bore has a larger diameter toward its outer end and in this way a shoulder is provided against which a ring 120 on the latch pin 119 is normally pressed by a coiled spring 121 which bears at one end against the ring 120, and at the other end against the end of a head 122 which is secured in the open end of the bore by one or more screws 123. The head 122 is clearly shown in Fig. 9 and from an inspection of this figure it will be seen that it has a central bore or opening for the passage of the outer end of the latch pin 119. Radiating from the central bore are two oppositely disposed slots 124. The outer end of the head 122 has flat segmental faces 125 located on opposite sides of slots 124. The outer end of the latch pin 119 is provided with a knurled head 126 which is secured to the end of the latch 119 in any suitable way, as by means of a transverse pin 127. Just inward of the head 126 is a transverse locking pin 128 which extends through the latch pin 119 and is of such size that its ends may be readily passed into and out of the slots 124. When the pin 119 is in its engaging position, that is to say, when it is in position to engage the flange 117 on the hub, then the locking pin 128 is in its innermost position, as illustrated in Fig. 7. When the latch pin 119 is to be moved outward so as to be free of engagement of the flange 117, then the locking pin 128 will be moved outward by pulling upon the head 126 and it may then be held in its outer position by rotating the pin 119 slightly to cause the ends of the lock pin 128 to ride on the surfaces 125 of the head 122. This latter position, wherein the latch pin 119 is held in open or disengaging position, is illustrated in Fig. 8.

Besides having the projection 116 to provide a shoulder for the reception of the flange ring 117, the hub F has in addition and at a point higher up a further projection 129 which has a flat under face upon which is a ring 130. The latter is a wear plate and it is held in position by suitable means, such as screws 131. The wear plate 130 bears directly upon an upper annular face formed upon the bearing member 109 of the bearing E. Normally, the hub F will engage the bearing E at the wear plate 130, and the hub will rotate upon the bearing member 109 with this annular contacting surface serving as the bearing surface between the two parts.

The hub F is provided with a number of upwardly inclined radial openings 132 which terminate in the open central bore of the hub. These openings correspond in number to the number of lifters D and filler heads H. Each opening is provided with an enlarged bore at its outer end terminating in a shoulder against which the ends of the communicating pipes 133 abut. These pipes are secured firmly in the hub F by any suitable means as by solder 134. At their outer ends they extend to and are in permanent connection with the filler heads H. At this point it may be again remarked that the hub F and the filler heads H move together as a unit during the operation of the machine. The upper section 46 of the column B is similarly set and secured by a soldered joint 135, the upper portion of the hub having a body sufficiently extended for that purpose.

In addition to holding the upper section 46, this portion of the hub also receives a ring 136 of substantial size and strength. This ring is in the form of a casting which closely fits around a tubular portion 137 of the hub, which portion also embraces the upper section 46. It is preferably secured to the hub F by cap screws 137$^a$. The ring 136 terminates in a socket member 138 which is open at its outer end and receives the inner end of a stout supporting rod 139 which is secured in the socket by any suitable means, such as the pin 138$^a$. The outer end of the rod 139 is slidably mounted with reference to the upper end of a post 140 which is seated and fixed in a sleeve member 141 positioned on the inner side of the carrier C, the post 140 being firmly held in place by suitable means, such as a set screw 142. The details of the connection between the rod 139 and post 140 are clearly shown in Fig. 15 and include a yoke member 139$^a$ and having separated arms 139$^b$ through which adjusting screws 139$^c$ pass. The screws are in threaded engagement with the arms 139$^b$ and at their inner ends closely approach the opposite sides of the post 140. Lock nuts 139$^d$ hold the screws 139$^c$ in set position. The screws 139$^c$ are preferably set so as to leave the space between their inner ends slightly greater than the diameter of the post 140, as clearly shown in Fig. 15. When thus set, the hub F is held firmly so as to rotate with the carrier and yet to freely rise and fall when the parts are adjusted vertically. In the case of such adjustment, of course, the yoke member 139$^a$ carrying the screws 139$^c$ will move vertically along the post 140 and the screws by contacting with the post as may be required will prevent the arm 139 rotating about the axis of the barometric column B.

Obviously, however, the screws 139$^c$ might be set up tight against the post 140 for any given vertical adjustment, but in such case, whenever the parts were again adjusted vertically, it would be necessary to first release the screws 139$^c$; while if they be left with a slight clearance, as noted, then it is not necessary to alter the positions of the screws 139$^c$ when making the new vertical adjustment.

But whichever way is employed, it will always be true that the relative rotary positions of the carrier and hub and all that the latter carries can be nicely determined. Consequently the filling heads H can be accurately and nicely adjusted with reference to the lifters D with which they are to operate. Each filler head can be accurately positioned directly above its lifter.

The intercepting chamber G at the top of the column B is provided in its bottom with a central opening and is there suitably secured to the upper section 46 of the column B. In this way the interior of the column is in direct communication with the interior of the chamber. The chamber is also supported by the column and obviously rotates with its upper section as the latter rotates. Completely spanning the space within the chamber G, like a drum head, is a baffle plate 143 having suitable openings 143$^a$, commonly about eight in number. Also near the periphery of the chamber but below the baffle plate 143 are connected a series of communicating tubes 144 which lead vertically downward to the filler heads H. Thus not only are the filler heads in direct communication with the column B, but they are also in direct communication with the intercepting chamber G. In addition to the baffle plate 143, the interior of the chamber G has an inclined flange 145 and suitable reinforcing rib or brackets 146. These ribs when in position upon the lower portion of the chamber G readily receive and center the upper portion of the same chamber when the two portions are being assembled. The ribs are firmly secured to the lower portion by welding or the like and readily receive the flange 145 which is preferably formed at the lower edge of the upper portion. When the two portions are properly assembled then a ring 146ª is slipped down over the joint into engagement with a bead 146ᵇ formed on the lower portion. When the parts are thus assembled, the connection is completed by soldering or welding or otherwise securing the parts together. The baffle plate 143 serves to prevent the passage of milk from beneath it into the exhaust passage communicating with the portion of the intercepter beneath it.

The vacuum pipe connection is made at the top of the chamber G. This may be varied, but preferably comprises a socket member 147 which is directly secured to a flange 148 formed at the opening in the chamber top. The socket member 148 cooperates with a ball member 149 carried upon the lower end of an elbow 150. A cooperating flanged holding ring 150ª is secured to the socket member 147 by a double bayonet joint comprising the pins 150ᵇ and associated slots 150ᶜ. The horizontal body or flange of the holding ring 150ª overhangs the periphery of said member so as to maintain the parts together while allowing a slight play at the joint. This play is facilitated by the convex surface upon the member 149 being made to fit the concave surface on the member 147.

Thus, a certain amount of play is possible between the chamber G and the pipe 151 which is connected to the upper end of the elbow 150 by a suitable gland 152. The exhaust pipe 151 is also in direct communication with an upright pipe 152 which rises from the axial opening of the exhaust pump Y. The pipes 151 and 152 are provided with a slip joint. This is accomplished by having the pipes telescoped one within the other, and then between the telescoped surface providing a ring 153 of circular cross-section. As the pipes move with reference to each other, the ring will roll up and down and maintain the joint sufficiently air-tight to meet the requirements of the machine. Obviously, any other slip joint of equal tightness might be employed instead of the one illustrated. The latter, however, has been found to give satisfactory results in practice.

The filler heads H, as before stated, are preferably the same as illustrated in Fagan's application Serial No. 614,474, but for the purposes of the present disclosure, it will no doubt suffice to employ heads of the construction shown in Broadhurst's Patent No. 1,665,948. In view of these facts, it seems unnecessary to describe the filler heads with great particularity. Their action is fully explained in the Broadhurst patent, which is now available to the public.

The liquid tank J, which, in the embodiment illustrated, is a milk supply tank, is provided with a downwardly extending supply pipe 154, which is mounted in a bracket 155, secured to one end of the base A. The pipe 154 is parallel to the column B and is in direct communication with the latter through the inter-connecting pipe 156. The pipe 156 has removable caps 157, 158 at its opposite ends and is rectilinear throughout so that it may be readily cleaned. The removable cap 158 is provided with a drain cock 158ª which may be opened to drain the filling element prior to the cleansing operations. The interior of the tank J may also be readily cleaned by simply removing the cover 159. Usually the opening in the bottom of the tank J is offset with reference to the valve 160 so that the pipe 154 may be readily cleaned by a swab or other simple cleaning device.

The valve 160 is a rotary valve actuated by a float 161 which is connected to the valve by a stem 162. The valve 160 rotates in a casing 163. Suitable openings in the casing and valve provide for the passage of liquid being fed through the inlet pipe 164. The latter is provided with a head 165 which is suitably secured to the apertured tank wall and, in turn, supports the valve casing 163 to which it is connected by suitable screws 166. The valve 160 may be adjusted longitudinally by an eccentric pin 167 suitably journaled in extensions of the casing 163. It may be pointed out that the valve herein shown forms the subject matter of a separate application, Serial No. 629,168, filed August 17, 1932, by Albert B. Mojonnier, one of the inventors herein, and issued as Patent No. 1,956,077, dated April 24, 1934. It is believed, however, that the operation of the valve will be clear from the disclosure herein and it should be borne in mind that any suitable float control valve may be employed in the tank J without departing from the spirit and scope of the present invention.

The outer end of the inlet pipe 164 is provided with a removable cap assembly 168, so that it, too, may be readily and properly cleaned after use. The inlet pipe 164 is connected on its upper side with a pipe 169 which is open at its upper end for the reception of a pipe 170, the two pipes being arranged telescopically. A flanged ring 171 is threaded on the upper end of the pipe 169 and forms with the pipe 170 a reasonably close joint. In the space between the pipes 169 and 170 is a ring 172 composed of rubber or other suitable material, which serves to provide a liquid-tight joint in the pipe connection and yet allow the pipes to be moved relative to each other.

As previously indicated, the tank J must be raised and lowered with the column B when the filling element is adjusted to suit differently sized bottles. Therefore, it follows that if the milk or other liquid be supplied through fixed connections, as through the supply pipe 173, then some form of slip-joint must be provided. Such a joint is furished by the telescoping pipes 169, 170 with the intervening rubber ring 172. This connection is similar to that provided by the ring 153 associated with the pipes 151 and 152. In the one case the connection is sufficiently air-tight for all practical purposes, and in the other case it is sufficiently liquid-tight.

In order to properly hold up the pipes 170 and 173, any suitable means might be employed. In the present instance, this means is shown on the machine and includes an angular arm 174 which is secured at its inner end to the bracket 155 near the lower end of the supply pipe 154, and at its upper end terminates in a socket in which rests a vertical rod 175 which supports a clean-out connection 176. This connection brings the pipes 170 and 173 into communication and also provides communication with a lateral pipe 177. These parts need not be particularly described, as they constitute no part of the present invention and the connection is one which is provided in order that the parts may be readily disassembled for cleaning purposes, and after cleaning, as readily properly assembled.

The operation of the filling element is substantially described in the aforesaid Broadhurst Patent No. 1,665,948, but for the purposes of filling out the present disclosure may be briefly stated. The milk or other liquid is supplied to the tank J and from it to the central column B by way of the connecting pipes 154, 156. Assuming that the liquid being handled is milk, then before the suction pump Y is started, the level in both column B and the tank will be that maintained by the float valve. When the machine has been thus filled, then the suction pump Y is set in operation and air is exhausted from the intercepting tank G and the central column B. Then, when a bottle Z is moved into engagement with a filler head H by the associated lifter D, the vacuum pressure maintained in the intercepter G draws air out of the bottle and associated tube 144 and milk from the central column passes up through the associated radial tube 133 and replaces the air withdrawn from the bottle. Any foam which forms is promptly drawn up through the foam tube 144. This action continues until the liquid has reached the proper level for a filled bottle. Then, by reason of the structure of the filling head H, which has a permanent leak passage, the liquid is not drawn up through the foam tube except as the same may be in small quantities or particles well mingled with the air. When the filled receptacle reaches the right point, it is lowered from the filler head and the air from outside enters the bottle and the vacuum is fully broken. At such time the milk in the supply tube 133 returns to the central supply column and siphons out any residue of liquid that may be in the filling head above the liquid level. There are refinements of operation when the filler head of the aforesaid Fagan application Serial No. 614,474, is employed, but these need not be gone into in this case, since the invention herein disclosed has to do with quite different features.

Coming now to the capper element, we have the base 178 which is adjustably secured to the wide portion of the flange 31 of the base A. Screws 179 threaded through fixed portions of the base A and engaging the periphery of the capper base 178, are employed to shift the base into proper position laterally. When once thus positioned it is held in place by suitable bolts and nuts 180. The standard L includes a tubular upright 181 which is secured to the capper base 178 and encloses a central adjusting rod 182. The latter is free to reciprocate in the tube 180 but is held against rotation by a feather 183 carried by the rod and operating in a suitable slot in a tubular bearing member 184 secured to the tube 180 at its upper end.

The capper carrier M includes a web which extends outward from a central hub 185 and terminates in a downwardly extending flange 186 which overhangs an upwardly extending flange 187 on the base A. At suitably spaced intervals around the periphery of the carrier M are the posts 188 of the bottle supports N which, as in the case of the filler, take the form of bottle lifters. Since the construction of the lifter N is the same as that of the lifter D, it will not be necessary to repeat the description in detail. It will suffice to point out that the oil well 189 is deeper than in the case of the filler, and the spring 190, sleeve 191 and skirt 191ª are longer than the corresponding parts in the case of the filler. Other slight differences will also be apparent on inspection of Figs. 17 and 18 of the drawings. The air passage 192 and its connecting passage 193 are also somewhat different in position.

In the case of the capper, the air passages 193 terminate in ports in the under face of the hub 185 and cooperate with groove segments 194, 195 and 196, provided by cutting a continuous groove in the upper face of the bearing member 197 and dividing such groove into parts 194, 195 and 196 by the interposition of plugs 198, 199 and 200. As clearly shown in Fig. 19, the section 194 is in direct communication with atmosphere through the port 201. On the other hand, the section 195 is in communication through the connection 202 with a source of supply of air under low pressure. In the installations heretofore made, this pressure has been in the neighborhood of from eight to ten pounds per square inch. In like manner, the section 196 has been in communication through connection 203 with a source of air under high pressure. In previous installations, this high pressure has been in the neighborhood of from fifteen to twenty-five pounds per square inch.

From what has been previously said, it will be clear that as the ports in communication with the capper lifters N are brought into communication with the different groove sections, there will be a corresponding action of the lifter head. Where the communication is with the section 194, the head will be in, or allowed to return to, its lowermost position. As the communication passes from section 194 to section 195, there will be a low pressure supply of compressed air which will cause the associated lifter head to move upward with sufficient force to bring the bottle upon it into engagement with the positioned cap, and the parts will remain in this condition until the lifter port passes into engagement with the high pressure section 196, and then the lifter will be pressed upward by reason of the greater pressure beneath it, with the result that the cap will be applied by contact with the plunger of the capping apparatus. Then, when the particular header is again brought into communication with the section 194, which is connected to atmosphere, the lifter and the bottle carried by it will return to the lowermost position. In the instance shown, the bearing block 197 in which the aforesaid grooves are provided is brought into proper seating engagement with the under side of the hub 185 of the carrier M by reason of one or more springs 204 which act between the member 197 and the capper base 178, acting in conjunction with the point support provided by the pin 205 which extends upward through an opening in the capper base 178 and into position to firmly engage the under side of the member 197. This pin is adjusted by means of an adjusting screw 206.

The supporting head O located at the top of the standard L comprises a hub 207 and a plurality of outwardly extending arms 208 which agree in number with the number of bottle lifters N. In the present instance there are six such arms and carriers. The hub 207 is mounted to slide upon a sleeve 209 which incloses the standard 181 and is secured at its lower end to the hub 185 of the carrier M. The sliding engagement is provided by a slot 210 in the tube 209 cooperating with a key or feather 211 secured at one point in the hub by a screw-bolt 212 which is passed through an opening in a portion of the hub into threaded engagement with an opening in the feather 211. By this construction the supporting head O may be moved up and down upon the standard L but will rotate with the sleeve 209 and the associated carrier M. The upper end of the tube 209 is separated from the standard 181 by a bearing ring 213. The latter is secured to a reduced portion of the standard 181 and provides an outer bearing surface for the interior of the tube 209.

The supporting head O carries on its upper side a sleeve 214 which is flanged at its lower end and secured to the head by suitable machine bolts 215. The sleeve 214 is closed at its upper end by a head 216 which is apertured at its center for the passage of the adjusting rod 182. The latter rod is connected by a transverse pin 217 to a sleeve 218 which carries at its lower end an outwardly extending flange 219. The flange 219 rests in a recess formed in the upper part of the head 216. Cooperating with this flange and head is a retaining ring 220 which is recessed on its under side and secured to the sleeve member 214 by machine screws 221 or other suitable means. By this construction the upper end of the sleeve 214 is connected to the upper end of the adjusting rod 182 and is free to rotate with reference to that rod although being shifted up and down by it.

Each arm 208 of the supporting head O has at its outer end a hub 222 which is provided with a central vertical bore in which is positioned the stem 223 of the capper plunger 224 which forms part of the operating mechanism R. A transverse pin 224ª extends through openings in each hub 222 and stem 223 and serves to hold the associated plunger firmly in position. As clearly shown the plunger 224 has an enlarged portion which provides a shoulder which bears against the under face of the hub 222.

The capper head P includes a plunger and magazine casing 225 which comprise essentially two cylinders, one a sleeve 226 which fits over the plunger 224 and the other a magazine in which the caps 228 are stacked, one upon the other, and from which they are adapted to be fed, one cap at a time taken from the bottom of the stack. The lower end of the combined plunger and magazine has secured to it a bottle engaging member 229. This member is in the form of a ring with a segmental skirt or flange 230 extending down from the ring in position to properly engage the oncoming bottle in each instance and thus hold it in proper receiving position for the cap, such as the cap 231 of Fig. 22 which is ready to be inserted.

The ring 229 is secured to the sleeve and magazine casing by any suitable means, such as the screws 232. The latter as clearly shown pass through a flange at the lower end of the casing 225 into threaded openings in the ring in the engaging member 229. As clearly shown the sleeve 226 is held upon the plunger by a transverse pin 233 which passes through an elongated slot 234. The relation of the pin and slot are such that the sleeve and attached parts of the capping head P may be moved up and down through quite a range. There is also on the opposite side of the sleeve 226 an opening 235 which is large enough to pass the pin 233 including its head. Normally the head is positioned in a recess in the plunger 224 as clearly shown in the drawings. When the parts are to be removed from the supporting head O then it is first necessary to remove the pin 224ª and detach the plunger 224 before it is possible to shift the casing 225 along the plunger far enough to bring the pin 233 opposite the opening 235 to allow the withdrawal of the pin. All this construction makes it possible to disassemble the parts readily and clean them, and afterward just as readily assemble them.

For the purpose of moving the lower-most cap of the stack 228 into proper position beneath the plunger 224 an actuating blade 236 is employed. This blade is part of the capper mechanism R and oscillates to and fro in a suitable arcuate passage 237 extending between the lower ends of the cap magazine 227 and the plunger sleeve 226. In its outer or receiving position the forward edge of the blade 236 passes to the left of the magazine 227 as the parts are viewed in Figs. 22 and 23. When in this position the stack of caps 228 drops until its lower-most cap engages the members 238 and 239 which lie on opposite sides of the channel 237 directly beneath the magazine 228 and in this way form ledges on which the cap-stack 228 rests. When the stack is in this position then the forward edge of the blade projects just high enough to engage the edge of the lower-most cap. Then as the blade advances that capper is carried forward in the channel 237 into a position directly beneath the plunger 224 for application to the positioned bottle.

In order to properly separate the caps as they are fed from the stack and especially in the case of caps that have wire stitched or stapled tabs on them, we provide a bevel 239ª which operates as the blade 236 advances. The forward end of the blade below the bevel engages the lowermost cap 231 and pushes the cap along before it. At the same time the bevel 239ª engages the cap which is immediately above the cap 231, and, as the blade advances, the cap thus engaged by the bevel is slightly elevated. This means that the caps above the lowermost are all elevated or the pile compressed by upward pressure to completely free the lowermost cap 231 from the caps above it and keep it free therefrom while it is being advanced.

As clearly shown in Fig. 23 the opening 240 in the member 229 lies directly beneath the plunger 224 and has its walls 241 and 242 slightly converging downward. In this way the cap is slightly reduced in diameter when the plunger acts upon it to force it into the bottle. In this connection it may be mentioned that the plunger 224 does not move downward but the cap head P and the associated sleeve 226 and magazine 227 are moved upward. As a result the cap, such as 231, is moved upward against the plunger and the continued travel of the member 229 contracts the cap and finally it is brought into position in the top of the bottle resting on the bottle shoulder and in holding engagement with the adjacent wall, as is usual with caps and bottles of this kind. It may be pointed out in this connection that the lifter N which carries the bottle upward is at first actuated by low pressure air and this is sufficient to bring the bottle up into engagement with the cap without firmly seating the cap upon the shoulder in the bottle neck. Following this partial application of the cap by the low pressure air, high pressure air is applied and the lifter is thrust upward more strongly and the cap is finally firmly seated in the bottle. While the blade 236 is thus advancing a cap to capping position, the remainder of the stack 228 rests upon the upper surface of the blade since the blade 236 will have reached the position shown in dotted lines in Fig. 23. Upon the return of the blade to its open or loading position the blade will again pass out from beneath the stack 228 and the latter will again fall into engagement with the ledge members 238 and 239 and be in readiness for the next feeding operation.

The blade 236 of the capper mechanism R is carried at the outer end of an arm 243. This arm is provided with an apertured boss or hub 244 which receives a vertical rock arm 245, to which it is firmly secured as by a transverse pin 246. The rock shaft 245 is journaled in apertured lugs 247 and 248 which extend laterally from a portion of the capper head casing and constitute bearings for said shaft. A return spring 249 is coiled about the shaft 245 between the bearings 247 and 248 and the upper end of the spring 249 is fastened to the bearing 247 while the lower end of the spring extends downward into an opening in the upper face of the collar 250, indicated at 250$^a$ in Fig. 24. The collar 250 has a series of notches 250$^b$ on its upper face, oppositely disposed in pairs. A transverse pin 250$^c$ extends through the rock shaft 245 and may be set in any desired pair of notches 250$^b$, after rotating the collar 250 to give the desired torsional tension in the spring 249. This turning of the collar 250 and consequent winding up of the spring 249 is done before the retaining pair 250$^c$ is driven through its opening in the shaft 245. This setting of the spring is usually done at the time and place of manufacture. If it is to be done at a later time the pin 250$^c$ must be removed while the spring is being wound up. The shaft 245 is held against longitudinal movement in its bearings by a collar 250$^d$ secured to the shaft by a pin 250$^e$ just above the upper bearing, and by the hub 244 which is secured to the shaft just below its lower bearing.

When the spring 249 is properly tensioned its action upon the rock shaft is to tend to hold it with its upper arm 251 pressing inward toward the center of rotation of the parts, as the same are viewed in Fig. 20. This arm 251 is formed at its outer end with an upright sleeve 252. This sleeve carries at its upper end an anti-friction roller 253 which is adapted to engage the outer surface of the actuating cam Q. As clearly shown the anti-friction roller 253 is mounted on a pin 254 which extends upward from the sleeve 252 and is secured therein by a transverse pin 255. The lower end of the sleeve member 252 is provided with a catch pin 256 which is normally pressed downward by a compression spring 257 located in the sleeve and acting in compression between a fixed part thereof and the upper end of the movable pin 256.

The cam Q may be variously constructed. In the present instance it comprises a downwardly extending flange 258 which provides the peripheral cam surface upon which the wheel 253 rides, and this flange extends downwardly from a horizontal plate 259 which is preferably formed integral with a vertical sleeve 260 having a head 261, the two parts 260 and 261 thus providing a hub for the cam and a closure for the upper part of the column L. The head 261 is centrally apertured and thickened around the aperture so as to provide for the application of set screws 262 which pass through openings in the thickened portion of the head into threaded openings in the member 218 which, it will be recalled, is firmly secured to the upper end of the adjusting rod 182. The spring pressed pin 256 associated with each of the rock arms 245 cooperates with a stop 263 secured to the upper end of the stem 223 of the associated plunger.

As clearly shown in Fig. 20 the cam Q engages the rollers 253 and oscillates each rocker arm 245 as the carrier M and head O rotate together. The movement of each rocker arm through its cycle advances a cap to capping position as previously mentioned and then withdraws for a subsequent like operation. It may be pointed out that since the rocker arm 245 is connected with the capper head P it must move upward with it. This means that whenever a bottle is moved upward by a lifter N and the capper head P is elevated the associated rocker arm 245 is also elevated. This elevation, however, does not move the roller 253 out of contact with the cam surface and consequently the capper mechanism is caused to perform its proper functions.

It will be noted, however, that if there is an upward movement of the lifter N in any particular case without a bottle being carried by it then the capper head P will not move upward and consequently the rocker arm 245 will not move upward. But still the cam roller 253 will be in position to be engaged by the cam Q. As a result the rock shaft will be rocked as usual but at this time, on account of its lower position, its latch pin 256 will pass over the inclined surface of the stop 263 and be pressed down by the spring 252 on the other side of the stop. Thus the capper blade 236 will be held back in open position and it will be so held until the same rock shaft is moved upward by the presence of a bottle upon the associated lifter which event will not occur until the cam wheel 253 again reaches the same peripheral point on the cam after a full revolution. When the shaft is moved upward by the presence of a bottle, then the cam wheel 253 will still remain in engagement with the cam Q but the rock shaft will be free to oscillate because its upward movement with the capper head P will clear its catch 256 from the stop 263.

As clearly indicated in Fig. 20 the bottles enter upon the carrier M at the time they pass from the arcuate guide 264, the rotating notched wheel 265 cooperating with the guide 264 to present the bottles in proper spaced relation. It may also be pointed out that the bottles leave the carrier M upon engagement with the conveyer guide 266 which cooperates with the conveying wheel 267. The cam position shown in Fig. 20 corresponds with the position of the groove member 197 through which the actuating air is supplied or exhausted as previously pointed out. It should also be noted in this connection that only portions of the guides 264 and 266 are shown in Fig. 20, the ends being broken away for clearness. The portions shown, however, locate the ingress and egress of the bottles as they contact with the capper.

The travel of the bottles Z is shown more fully in the diagrammatical plan of Fig. 16. As there shown they pass from the conveyer T into engagement with the notched conveyer wheel 268 and this wheel cooperating with the arcuate guide 269 carries the bottles around in spaced relation so as to present a bottle to each of the lifters D of the filling element of the machine. As the bottles are carried around by the carrier C upon which the lifters D are located the bottles will be filled as previously explained. When the filling operation has been completed then the bottles will be brought into engagement with the notches of the notched wheel 265 and this wheel cooperating with the guide 264 will move the bottles in proper spaced relation upon the lifters N of the capper carrier M and the caps will be applied to the bottles as explained heretofore. When the capping operation is completed then the bottles will engage the conveying wheel 267 and through the cooperation of the associated guide 266 will be delivered from the machine onto the carrier V. The conveyers T and V may be variously constructed but are preferably conveyers of the kind illustrated in Mojonnier application Serial No. 577,558, filed November 27, 1931, Patent No. 1,929,707, granted October 10, 1933. In other instances it may be desirable to employ the similar conveyer of Mojonnier Patent 1,804,701, granted May 12, 1931.

In order to adjust the filling and capping elements as a unit, in order to suit bottles of different sizes, the adjusting mechanism W is employed. This includes a rock shaft 270 which is journaled in suitable bearings formed in brackets 271, 272 secured to the under side of the base or frame A. This rock shaft is provided with an upwardly extending crank arm 273 which is suitably keyed to the shaft and held against shifting along the shaft by a set screw 273ª. The upper end of this arm is pivotally connected to one end of a horizontally disposed member 274. The opposite end of this member is provided with a threaded opening through which extends a screw 275. This screw is connected to a rod 276 by means of a transverse pin 277 and the rod in turn is connected to a notched socket 278 which is adapted to receive the end of a crank 279 to be turned by hand. A suitable roller bearing 280 is provided in a casing 281. The rod 276 is journaled in the bearing 280. It will be seen that as the crank 279 is turned the member 274 will be moved to and fro along the screw and in consequence thereof, the rock shaft 270 given a rocking movement. Because of the screw connection, the rotary adjustment of the rock shaft can be accomplished with great accuracy and nicety. The adjusting mechanism W is shown in different positions in different figures. Thus, by way of illustration the adjustment in Fig. 5 is for quart size bottles while in Fig. 3 it is suited to quarter pint size bottles. These illustrations will suffice for, obviously, the mechanism can be adjusted to suit all sizes through a wide range.

The rock shaft 270 is provided with rock arm 282 which is firmly secured to the shaft at one end and at its free end is connected to the upper end of a curved link 283 which passes around beneath the inter-connecting supply pipe 156 and is pivotally connected at its lower end to a lug 284 formed upon the pipe 156. A connection is also provided between the shaft 270 and the other end of the connecting pipe 156. This connection includes a rock arm 285 which is secured at one end to the shaft and at its other end is provided with bifurcated arms 286, 287 which pass around opposite sides of the lower section 45 of the central column B of the filling element. Cooperating with these bifurcated ends is a link 288 which also has bifurcated arms 289, 290. The arm 286 of the rock arm and the arm 289 of the link are pivotally connected. The same is true of the arms 287 and 290. The lower end of the link 288 is pivotally connected between lugs 291 formed on the under side of the inter-connecting pipe 156. It will be recalled that the pipes 45 and 154 which are connected to and extend upwardly from the inter-connecting pipe 156 are vertically movable in bearings 43 and 155 respectively. Since this is so, any rocking of the shaft 270 will be communicated to the rock arms 282 and 285 and by the latter and their link connections to the pipes 45, 156 and 154 which will thus be raised and lowered as desired. Here it may be noted that a collar 291ª held to the shaft 270 by a set screw 291ᵇ on one side of the hanger 271 cooperates with the arm 282 on the other side of the same hanger to hold the shaft 270 against longitudinal displacement.

As previously noted, the rock shaft is also employed to raise and lower the adjustable elements of the capper. As clearly shown the capper adjustment brought about by this rock shaft is the up and down movement of the adjusting rod 182 which carries the supporting head O and associated parts. The lower end of the rod 182 is provided with an adjusting member 292. This member has an apertured boss 293 through which the rod 182 extends. It also has a pair of arms 294, 295 which are provided with aligned horizontal openings at their lower ends. The arms 294, 295 are connected by transverse web 296. The lower end of the rod 182 terminates in a screw 297. This screw end passes freely through an opening in the web 296. Nuts 298 and 298ª engage the upper and lower sides respectively of the web 296 in order to adjust the rod accurately with respect to the adjusting member 292. The latter has its lower arms 294, 295 connected by links 299, 300 to the bifurcated ends of a rock arm 301 keyed or otherwise firmly secured to the rock shaft 270, the key 301ª holding the arm against rotation and the set screw 301ᵇ holding the same against longitudinal movement along the shaft. Screw 301ᶜ holds the key against displacement.

It will thus be seen that when rock shaft 270 is given its nice adjustments the capper rod 182 will also be nicely adjusted. The adjustments of the pipe 156 and the associated central column and supply tank of the filler insures proper operation of the filling element of the machine no matter what the size of the bottles being filled. At the same time the accurate adjustment of the capper head insures proper capping operation. The independent adjustment of the capper rod 182 with reference to the member 292 at its lower end makes it possible to obtain very accurate adjustments of the capper parts with reference to the filling parts and in this way the adjustments of the filling and capping are still quite independent of each other.

For the purpose of driving the various parts of the filler and capper elements in proper timed relation, suitable gearing must be provided. In the present instance the motor X is an electric motor and it drives a main shaft 302 by a belt 303 which passes over a pulley 304 mounted on the shaft 302. The belt 303 is preferably closed in a casing 305 for safety. The shaft 302 is suitably journaled in bearings carried by the wide portion of the flange 31 of the base A, said portion, as before noted, being at the capper end of the machine. The shaft 302 is also provided with a hand wheel 306 so that when the machine is not being driven by the motor X the main shaft may be turned by hand to bring the different parts of the machine to desired positions. The inner end of the shaft 302 carries a bevel pinion 307. This pinion engages a large bevel gear wheel 308 keyed to a vertical shaft 309 which is suitably journaled in the floor 30 of the main frame A. The shaft 309 also carries a pinion 310 which is firmly keyed to it. The pinion 310 engages a gear wheel 311 which is keyed to a vertical shaft 312 also mounted in the floor 30 of the main frame. The gear wheel 311 engages the gear rack 61 of the carrier C and through this train of gearing the latter is rotated. The shaft 312 also carries the notched conveyer wheel 265 which serves to convey bottles from the filling element to the capping element.

As shown in Fig. 1, the shaft 312 extends up through a sleeve 313 and the latter serves to support the conveying guide 264, that portion 313$^a$ of the guide frame structure through which the shaft 312 extends and to which the sleeve is secured being shown in dotted lines in Fig. 16 and in vertical section in Fig. 1. Similarly, guide wheel 268 is mounted at the upper end of shaft 314 and this shaft carries at its lower end a gear wheel 315, the wheel being keyed or otherwise fixed to the shaft. Here, too, the shaft, 314, extends upward through a sleeve, the same being sleeve 313$^a$ shown perhaps most clearly in Fig. 5. The wheel 315 meshes with the rack 61 upon the carrier C and as the latter is driven, power is also applied to the conveying wheel 268. With a supporting structure furnished for the shaft 314 similar to that furnished for the shaft 312; as just pointed out, the associated guide 269 may be similarly supported.

The capper carrier M is provided with a gear rack 316 which is suitably secured to the under side of the carrier and is in effect a gear wheel lying in a plane of the gear wheel 311. The latter being driven from the main drive shaft 302 serves also by engagement with the wheel 316 to rotate the carrier M of the capper. At the same time gear wheel 317 keyed to shaft 318 and lying in the plane of the gear rack 316 is driven by the latter to rotate the shaft 318. The shaft 318, like the shafts 312 and 314, is suitably journaled in portions of the main frame and has the conveyer wheel 267 secured to its upper end. Thus, all of the movable filling and capping elements and the conveying elements outside of the straight-away conveyers T and V are driven from the main driving shaft 302 which is normally rotated by the electric motor X. The conveyers T and V being old are not described in detail.

The centrifugal pump Y may be driven from any suitable source. In the present instance the pulley 319 of the rotor of the pump is driven through a belt 320 from a driving pulley 321 driven by the electric motor X' located on the floor below the motor X. Obviously, different driving arrangements might be employed equally as well as those shown.

Before concluding our disclosure, it should be pointed out that in the compressed air feed provided by the particular segmental passageways 49, 50 of Fig. 3, the filling of the bottles carried upon the traveling supports, will continue practically throughout the entire length of the segment 49. In other words, there will be a filling time directly proportional to the length of the segment which is connected to the compressed air supply. This arrangement has been found quite satisfactory in practice for bottles of all sizes up to and including the quart size. The time provided by this spacing of the plugs 47, 48 is amply sufficient at the speed of rotation employed by us in practice to nicely fill quart size bottles. Other bottles of smaller size will of course also be completely filled but in the latter case some of the liquid will pass entirely through the bottle. This ordinarily does no harm. However in some cases purchasers or others may like an arrangement by which each bottle, of whatever size, will not receive substantially more liquid than just enough to fill it.

To meet this need an arrangement like that illustrated in Figs. 29 and 30 may be employed. As there shown, the continuous groove which extends completely around the upper bearing surface of the supporting ring 36 is provided not only with the segmental passage 50 bounded by the plugs 47, 48, but there are the additional plugs 322, 323 and 324, which divide what was formerly the segmental passageway 49 into the segmental passageways 325, 326, 327 and 328. As before, the passageway 50 is connected directly to atmosphere through the port 52. These passageways are arranged for communication with a compressed air supply pipe 329, the passageway 325 being permanently so connected and passageways 326, 327 and 328 being each connectible therewith through a three-way valve capable also of connecting the associated passageway directly to atmosphere. The air supply pipe 329, in the embodiment illustrated, is made up of segments which connect T's 330 associated with the different passageways. As clearly shown, passageway 325 is connected to pipe 329 by way of a pipe 331 and the associated T 330. In the case of passageway 326 the connection is by way of valve 334 interconnected by means of the short pipes or nipples 335 and 336. Similarly connection is established to passageway 327 through valve 337 and pipes 338 and 339. And a similar connection to passageway 328 includes valve 340 and connecting pipes 341 and 342. A plug 343 closes the end of the compressed air supply pipe 329. In the case of the permanent connection to passage 325 through pipe 331 the same is completed through a port 344. In the case of valve 334 and passageway 326. a similar function is performed by port 345. Likewise the port 346 is, in turn, used to establish communication between valve 337 and passage 327. And, finally, port 347 completes connection between valve 340 and passageway 328.

From the sectional view shown in Fig. 30, wherein valve 337 appears, it will be clear that when the inner valve member 348 is in the position shown, then port 346, which communicates with segmental passage 327, is in direct communication with atmosphere and the connection with the compressed air pipe 329 will be closed. As shown, the interior valve member 348 has aligned ports or openings 349 and 350. The same member also has at right angles to these aligned ports a third port 351. As stated, the connection between the port 346 is directly to atmosphere with the valve in the position illustrated, the port 351 opening directly into pipe 338, and the port 349 opening directly into the open end 352 of the outer valve member, said end being open to atmosphere. Now, if the three-way valve 337 be moved to its alternate position, the ports 349 and 350 of the inner member 348 will be brought into alignment with the pipes 338 and 339 by a movement of the member 348 in a clockwise direction through an angle of 90 degrees, as indicated by the arc, designated 353, in the lower left hand portion of Fig. 30. This movement of the inner valve will do three things. It will, first of all, bring the port 351 against that wall of the casing which lies opposite to its open end 352. This positioning of the port 351 will leave it closed and out of service. The second thing which this movement of the inner valve member 348 will do is to close port 352. The third thing is to bring the pipes 338 and 339 into direct communication through aligned ports 349 and 350. Thus, in one position, the port 346, and hence the passage 327, is in direct communication with atmosphere and the air supply is cut off, while in the other position the connection to atmosphere is cut off and the passage 327 is placed in direct communication with the compressed air supply pipe 329.

With this explanation it will be apparent that the various passageways 326, 327 and 328 may be connected at will either to atmosphere or to the air supply pipe 329. Thus, while a bottle lifter is traveling over the exhaust passageway 50, it will be in its lowermost position. Then, as it passes from passageway 50 over plug 48 and into communication with passageway 325, compressed air will be admitted to raise the lifter and it will be held in elevated position as long as communication is maintained with passageway 325. In regular practice, the lifters are all raised as they pass from segmental passageway 50 to segmental passageway 325. Therefore the communicating connection between pipe 329 and passageway 325 is maintained at all times by the permanent connecting pipe 331 and it is unnecessary to use a valve in this connection as it may be in the case of the other connections to segmental passageways.

Now, if the bottles being filled are of quart size, then all the valves 337 and 340 are placed in position to connect their respective passages with the air supply pipe 329. With this arrangement, according to the speeds which have been commonly employed heretofore in practice, each bottle will be gradually filled and the filling operation will be completed about the time the bottle reaches the plug 47. In other words, the filling will be completed about the time the lifter passes from segmental passageway 328 to segmental passageway 50.

Now, if the bottles are of other than quart size, such as pint, half-pint and quarter-pint size, and the valves are left in the condition just stated, then obviously each bottle, as it travels around, will be filled before reaching the plug 47, but, as previously stated, the only effect is that some milk will pass through the bottle and a little unnecessary work will be done in so passing it. This, as before noted, is not in ordinary practice a serious matter. However, if it is desired to stop the filling operation just as soon as the bottle is filled, then use must be made of the three-way valves 334, 337, 340 in order to vary the compressed air and exhaust connections.

If then, pint bottles are being filled and the filling is to be stopped just as each bottle is completely filled, all that is necessary is to change the position of valve 340 so as to place the passageway 328 in communication with atmosphere. In other words, all that is necessary is to place the passageway 328 in the same condition as the passageway 50. This means that as soon as the pint bottle reaches the plug 324 its carrier will be lowered and the filling operation will be discontinued.

Now, in like manner, if bottles of half-pint size are being used, then the filling operation may be stopped in the neighborhood of plug 323 by further opening valve 337 to atmosphere so as to exhaust passage 327.

Again, if the bottles be of quarter pint size, valve 334, in addition to the others, may be moved to exhaust position thereby also placing passage 326 in direct communication with atmosphere. In this case the quarter-size bottle will be filled while passing from plug 48 to plug 322.

It should be noted that different numbers of three-way valves might be employed and that the lengths of the segments might be varied by differently positioning the plugs 47, 48, 322, 323, 324, and 347. Or, again, there might be additional or fewer plugs, and these might be variously arranged, depending of course upon the size of bottles to be filled and other conditions. It should be kept in mind, too, that these various positions will depend upon the speed of travel of the carrier upon which the various bottle supports are located. Thus, many different arrangements and operations may be employed, depending upon the conditions of service and the judgment of the maker of the machine.

Obviously, in putting our invention into practice, many other changes than those mentioned may be made and especially in the various details disclosed and yet full use be made of the invention. What has been said concerning the modified arrangement of Figs. 29 and 30 will suggest possibilities in this direction. Other changes will also suggest themselves to persons skilled in this art. Because of these facts, we aim to cover by the terms of the appended claims all those alterations and modifications which rightly come within the spirit and scope of our invention.

We claim:

1. A machine of the class described comprising a fixed base, a vertical tubular column composed of two separable sections, an upper section and a lower section, a bottle carrier journaled to rotate about said column, bottle supports spaced about the periphery of said carrier, a bearing at the upper end of said lower tubular section, a hub secured to the lower end of said upper section and journaled in said bearing, means for separably securing said hub and bearing together to maintain said sections together for unitary movement of said column and to allow of the ready separation of said sections for cleaning, connecting means between said carrier and hub whereby the latter rotates with the former, an intercepting chamber with which said column communicates at its upper end, filler heads above said bottle supports, communicating tubes between said heads and chamber, communicating radial tubes extending from said hub to said heads respectively, a sleeve bearing for said upper section mechanically connected to and supported by said carrier, a liquid supply pipe communicating with said lower section, and means for shifting said column up and down as a unit to vary the elevation of said filler heads relative to said bottle supports.

2. A machine of the class described comprising a fixed base, a vertical tubular column composed of two separable sections, an upper section and a lower section, a bottle carrier journaled to rotate about said column, bottle supports spaced about the periphery of said carrier, a bearing at the upper end of said lower tubular section, a hub secured to the lower end of said upper section and journaled in said bearing, a movable latch pin on said bearing and a cooperating projecting flange on said hub for engaging said pin to hold said parts together for unitary movement of said column and to allow of the separation of said column sections for cleaning, connecting means between said carrier and hub whereby the latter rotates with the former, an intercepting chamber with which said column communicates at its upper end, filler heads above said bottle supports, communicating tubes between said heads and chamber, communicating radial tubes extending from said hub to said heads respectively, a sleeve bearing for said upper section mechanically connected to and supported by said carrier, a liquid supply pipe communicating with said lower section, and means for shifting said column up and down as a unit to vary the elevation of said filler heads relative to said bottle supports.

3. A machine of the class described comprising a fixed base, a vertical tubular column composed of two separable sections, an upper section and a lower section, a bottle carrier journaled to rotate about said column, bottle supports spaced about the periphery of said carrier, a tubular bearing member secured to the upper end of said lower section and having exterior threads and an interior packing space, a tubular hub secured to the lower end of said upper section and entering the tubular space within said tubular bearing member, an annular bearing member screwed on to the exterior threads of said tubular bearing member, the upper surface of said annular bearing member engaging a journal surface on an outwardly extending portion of said hub, packing in said packing space engaging the outer surface of the lower end of said upper section, a follower ring for pressing said packing into engagement with said upper section, an inwardly extending flange on said annular bearing member for forcing said follower ring against said packing as said annular bearing member is screwed down upon said tubular bearing member, an outwardly extending flange on said hub adjacent to said flange on said annular bearing member, a radial spring pressed latch pin carried by the latter and operative to extend over said hub flange to hold said sections against separation and to be removed out of possible contact with said flange to free said sections for separation, connecting means between said carrier and hub whereby the latter rotates with the former, an intercepting chamber with which said column communicates at its upper end, filler heads above said bottle supports, communicating pipes between said heads and chamber, communicating radial tubes secured to said hub at their inner ends and at their outer ends to said heads respectively, said tubes opening into the interior of said column, a sleeve bearing for said upper section mechanically connected to and supported by said carrier, a liquid supply pipe communicating with said lower section, and means for shifting said column up and down as a unit to vary the elevation of said filler heads relative to said bottle supports.

4. A machine of the class described comprising a fixed base, a central vertical tubular column, an intercepting chamber with which the upper end of said column communicates, a bottle carrier journaled to rotate about said column, bottle supports spaced about the periphery of said carrier, filler heads above said supports, communicating tubes between said heads and chamber, radial tubes communicating at their inner ends with said column and at their outer ends with said heads respectively, means for rotating said heads and supports and connected parts, a liquid supply tank, a supply pipe extending downward from said tank, an inter-connecting pipe between said supply pipe and column, a float valve in said tank for maintaining uniform liquid levels in said tank and consequently, because of said pipe connections, in said column, and means for shifting said column and tank and connected parts up and down to suit differently sized bottles on said supports.

5. A machine of the class described comprising a fixed base, a central vertical tubular column, an intercepting chamber with which the upper end of said column communicates, a bottle carrier journaled to rotate about said column, bottle supports spaced about the periphery of said carrier, filler heads above said supports, communicating tubes between said heads and chamber, radial tubes communicating at their inner ends with said column and at their outer ends with said heads respectively, means for rotating said heads and supports and connected parts, a liquid supply tank, a supply pipe extending downward from said tank, an inter-connecting pipe between said supply pipe and column, a float valve in said tank for maintaining uniform liquid levels in said tank and consequently, because of said pipe connections, in said column, means for shifting said column and tank and connected parts up and down to suit differently sized bottles on said supports, supply inlet connections to said tank, a suction pump, suction connections between said pump and intercepting chamber, and tight telescopic joints in said supply and suction connections, liquid tight for the former, and air tight for the latter, whereby said parts may be shifted as stated while maintaining proper operative conditions for the machine in all adjusted positions.

6. A machine of the class described comprising a fixed base, a central vertical tubular column, an intercepting chamber with which the upper end of said column communicates, a bottle carrier journaled to rotate about said column, bottle supports spaced about the periphery of said carrier, filler heads above said supports, communicating tubes between said heads and chamber, radial tubes communicating at their inner ends with said column and at their outer ends with said heads respectively, means for rotating said heads and supports and connected parts, a liquid supply tank, a supply pipe extending downward from said tank, an inter-connecting pipe between said supply pipe and column, a float valve in said tank for maintaining uniform liquid levels in said tank and consequently, because of said pipe connections, in said column, a rock shaft, connections between said shaft and said inter-connecting pipe whereby rotations of said shaft will raise and lower said pipe, column, tank and other parts carried by them to suit differently sized bottles on said supports, and means for rocking said shaft.

7. A machine of the class described comprising a fixed base, a central vertical tubular column, an intercepting chamber with which the upper end of said column communicates, a bottle carrier journaled to rotate about said column, bottle supports spaced about the periphery of said carrier, filler heads above said supports, communicating tubes between said heads and chamber, radial tubes communicating at their inner ends with said column and at their outer ends with said heads respectively, means for rotating said heads and supports and connected parts, a liquid supply tank, a supply pipe extending downward from said tank, a horizontal inter-connecting pipe between said supply pipe and column, a float valve in said tank for maintaining uniform liquid levels in said tank and consequently, because of said pipe connections, in said column, a rock shaft journaled in said base and extending in a direction substantially parallel to said inter-connecting pipe, rock arms extending outward from said shaft and terminating above said pipe, links connecting the outer ends of said arms to said pipe, a crank arm on said shaft, and a screw and nut connection with said base for shifting said crank arm to vary the positions of the various parts including said intercepting chamber and said filler heads to suit differently sized bottles on said carriers.

8. A machine of the class described comprising a fixed base, a central vertical tubular column, an intercepting chamber with which the upper end of said column communicates, a bottle carrier journaled to rotate about said column, bottle supports spaced about the periphery of said carrier, filler heads above said supports, communicating tubes between said heads and chamber, radial tubes communicating at their inner ends with said column and at their outer ends with said heads respectively, means for rotating said heads and supports and connected parts, a liquid supply tank, a supply pipe extending downward from said tank, an interconnecting pipe between said supply pipe and column, a float valve in said tank for maintaining uniform liquid levels in said tank and consequently, because of said pipe connections, in said column, a rock shaft, connections between said shaft and said inter-connecting pipe whereby rotations of said shaft will raise and lower said pipe and said column and tank and other parts carried by them to suit differently sized bottles on said supports, means for rocking said shaft, supply inlet connections to said tank, a suction pump, suction connections between said pump and intercepting chamber, and tight telescopic joints in said supply and suction connections, liquid tight for the former and air tight for the latter, whereby said parts may be shifted as stated while maintaining proper operative conditions for the machine in all adjusted positions.

9. A machine of the class described comprising a filling element and a capping element, a fixed base for said elements; said filling element including a central vertical tubular column extending upward from said base, an intercepting chamber with which the upper end of said column communicates, a bottle carrier journaled to rotate about said column, bottle supports spaced apart about the periphery of said carrier, filler heads above said supports, communicating tubes between said heads and chamber, and radial tubes communicating at their inner ends with said column and at their outer ends with said filler heads respectively, said supports, heads, pipes, intercepting chamber and connected parts being rotatable as a unit; said capping element including a tubular standard extending upward from said base, a carrier journaled to rotate about said standard, bottle supports spaced apart about the periphery of said latter carrier, an adjusting rod extending throughout the length of and within said tubular standard, a connecting tube enclosing said standard and secured at its lower end to the said associated carrier, a supporting head splined to said tube and supported by said adjusting rod, capper heads carried by said supporting head directly above the associated bottle supports, a cam carried by said adjusting rod, and means operated by said cam to apply caps to bottles engaging said capper heads; mechanical means for transferring bottles from said filling element carrier to said capping element carrier; means for rotating said carriers in proper timed relation; and means for shifting said filler column and capper adjusting rod up and down as a unit to suit differently sized bottles on said filler and capper supports.

10. A machine of the class described comprising a filling element and a capping element, a fixed base for said elements; said filling element including a central vertical tubular column extending upward from said base, an intercepting chamber with which the upper end of said column communicates, a bottle carrier journaled to rotate about said column, bottle supports spaced apart about the periphery of said carrier, filler heads above said supports, communicating tubes between said heads and chamber, and radial tubes communicating at their inner ends with said column and at their outer ends with said filler heads respectively, said supports, heads, pipes, intercepting chamber and connected parts being rotatable as a unit; said capping element including a tubular standard extending upward from said base, a carrier journaled to rotate about said standard, bottle supports spaced apart about the periphery of said latter carrier, an adjusting rod extending throughout the length of and within said tubular standard, a connecting tube enclosing said standard and secured at its lower end to the said associated carrier, a supporting head splined to said tube and supported by said adjusting rod, capper heads carried by said supporting head directly above the associated bottle supports, a cam carried by said adjusting rod, and means operated by said cam to apply caps to bottles engaging said capper heads; mechanical means for transferring bottles from said filling element carrier to said capping element carrier; a rock shaft journaled in said base; connections between said shaft on the one hand and said filler column and capper adjusting rod on the other hand whereby rotations of said shaft will raise and lower said column and rod and the parts carried thereby as a unit to suit bottles of different sizes; and means for rocking said shaft.

11. A machine of the class described comprising a filling element and a capping element, a fixed base for said elements; said filling element including a central vertical tubular column extending upward from said base, an intercepting chamber with which the upper end of said column communicates, a bottle carrier journaled to rotate about said column, bottle supports spaced apart about the periphery of said carrier, filler heads above said supports, communicating tubes between said heads and chamber, and radial tubes communicating at their inner ends with said column and at their outer ends with said filler heads respectively, said supports, heads, pipes, intercepting chamber and connected parts being rotatable as a unit; said capping element including a tubular standard extending upward from said base, a carrier journaled to rotate about said standard, bottle supports spaced apart about the periphery of said latter carrier, an adjusting rod extending throughout the length of and within said tubular standard, a connecting tube enclosing said standard and secured at its lower end to the said associated carrier, a supporting head splined to said tube and supported by said adjusting rod, capper heads carried by said supporting head directly above the associated bottle supports, a cam carried by said adjusting rod, and means operated by said cam to apply caps to bottles engaging said capper heads; mechanical means for transferring bottles from said filling element carrier to said capping element carrier; a horizontal supply pipe connected to the lower end of said filler column; a rock shaft journaled in said base and lying substantially parallel to said supply pipe; rock arms extending outward from said rock shaft and terminating above said pipe and adjacent to said capper adjusting rod; links connecting the outer ends of said rock arms to said pipe and rod; a crank arm on said shaft; and a screw and nut connection acting between said base and crank arm to rock said rock shaft to raise and lower said filler column and capper rod and the parts carried by them, said filler column, capper rod and the parts carried thereby being movable as a unit, to suit bottles of different sizes on said filler and capper carriers.

12. A machine of the class described comprising a filling element and a capping element, a fixed base for said elements; said filling element including a central vertical tubular column extending upward from said base, an intercepting chamber with which the upper end of said column communicates, a bottle carrier journaled to rotate about said column, bottle supports spaced apart about the periphery of said carrier, filler heads above said supports, communicating tubes between said heads and chamber, radial tubes communicating at their inner ends with said column and at their outer ends with said filler heads respectively, said supports, heads, pipes, intercepting chamber and connected parts being rotatable as a unit, a liquid supply tank, a supply pipe extending downward from said tank, an inter-connecting pipe between said supply pipe and column, a float valve in said tank for maintaining uniform liquid levels in said tank and consequently, because of said pipe connections, in said column, said column and tank and connected parts being movable up and down as a unit; said capping element including a tubular standard extending upward from said base, a carrier journaled to rotate about said standard, bottle supports spaced apart about the periphery of said latter carrier, an adjusting rod extending throughout the length of and within said tubular standard, a connecting tube enclosing said standard and secured at its lower end to the said associated carrier, a supporting head splined to said tube and supported by said adjusting rod, capper heads carried by said supporting head directly above the associated bottle supports, a cam carried by said adjusting rod, and means operated by said cam to apply caps to bottles, engaging said capper heads, said rod, supporting head, capper heads and connected parts being movable up and down as a unit; mechanical means for transferring bottles from the carrier of said filling element to the carrier of said capping element; means for rotating said carriers in proper timed relation; a rock shaft journaled in said base and lying substantially parallel to said inter-connecting pipe, connections between said rock shaft on the one hand and said inter-connecting pipe and capper adjusting rod on the other hand to raise and lower said pipe and rod in response to rotary movements of said rock shaft whereby said capping and filling elements and the parts associated with each as aforesaid will be adjusted up and down as a unit to suit bottles of different sizes; and means for rocking said rock shaft.

13. In a machine of the class described, a bottle lifter comprising a post provided with a central cylindrical well, a dash pot piston movable therein, a piston rod, an abutment, a spring surrounding said rod and operating against said abutment to normally press said piston downward, said well being adapted to hold a liquid operative to retard the downward movement of said piston, a lifting head having a cylindrical wall fitting over said post, the upper end of said head being connected to said piston, packing operating between the upper end of said post and said cylindrical wall to form a reasonably tight air chamber within said head, said post having openings through which air under pressure may be supplied to and exhausted from said chamber, and means for controlling said supplying and exhausting of air to and from said head.

14. In a machine of the class described, a bottle lifter comprising a post provided with a cylindrical well adapted to hold a liquid and to act as a dash pot, a piston movable therein, a piston rod having longitudinal grooves at diametrically opposite points in its surface, fixed keys at the upper end of said well entering said slots and operative to guide said piston rod, a spring surrounding said rod and acting against the under side of said keys to press said piston and connected rod downward, a lifting head having a cylindrical skirt fitting over the upper end of said post, packing acting between said post and skirt to provide a reasonably tight air chamber with said head, said post having openings through which air under pressure may be supplied to and exhausted from said chamber, and means for controlling said supplying and exhausting of air to and from said head.

15. In a machine of the class described, a bottle lifter comprising a post provided with a central cylindrical well, a dash pot piston movable therein, a piston rod, an abutment, a spring surrounding said rod and operating against said abutment to normally press said piston downward, said well being adapted to hold a liquid operative to retard the downward movement of said piston, a lifting head having a cylindrical wall fitting over said post, the upper end of said head being connected to said piston, packing operating between the upper end of said post and said cylindrical wall to form a reasonably tight air chamber within said head, said post having openings through which air under pressure may be supplied to and exhausted from said chamber, means for controlling said supplying and exhausting of air to and from said head in response to movements of said head, and means for rotating said post as a unit about an axis wholly outside of said post.

16. In a machine of the class described, a bottle lifter comprising a post provided with a cylindrical well adapted to hold a liquid and to act as a dash pot, a piston movable therein, a piston rod having longitudinal grooves at diametrically opposite points in its surface, fixed keys at the upper end of said well entering said slots and operative to guide said piston rod, a spring surrounding said rod and acting to press said piston and connected rod downward, a lifting head having a cylindrical skirt fitting over the upper end of said post, packing acting between said post and skirt to provide a reasonably tight air chamber with said head, said post having openings through which air under pressure may be supplied to and exhausted from said chamber, means for controlling said supplying and exhausting of air to and from said head in response to movements of said head, and means for rotating said post as a unit about an axis wholly outside of said post.

17. A machine of the class described comprising a fixed base, a central vertical tubular column, an intercepting chamber in which the upper end of said column communicates, a bottle carrier journaled to rotate about said column, pneumatically actuated bottle supports spaced about the periphery of said carrier, filler heads above said supports against which bottles on said bottle supports are to be pressed to make suction filling engagement therewith, communicating tubes between said heads and chamber, radial tubes communicating at their inner ends with said column and at their outer ends with said heads respectively, means for supplying milk to said column and maintaining the same at a proper level when quiescent, a suction pump, suction connections between said pump and intercepting chamber, means for rotating said carrier with its supports and said heads together, said bottle supports having in each case a bottle engaging member above an air chamber, said chamber being in communication with passages terminating in ports on the under bearing face of said carrier, said base having a grooved passageway on its upper bearing surface for cooperation with said ports, means for dividing said passageway into segments, and means for variously connecting said segmental passageways with a compressed air supply and to atmosphere to variously operate said bottle supports.

18. A machine of the class described comprising a fixed base, a central vertical tubular column, an intercepting chamber in which the upper end of said column communicates, a bottle carrier journaled to rotate about said column, pneumatically actuated bottle supports spaced about the periphery of said carrier, filler heads above said supports against which bottles on said bottle supports are to be pressed to make suction filling engagement therewith, communicating tubes between said heads and chamber, radial tubes communicating at their inner ends with said column and at their outer ends with said heads respectively, means for supplying milk to said column and maintaining the same at a proper level when quiescent, a suction pump, suction connections between said pump and intercepting chamber, means for rotating said carrier with its supports and said heads together, said bottle supports having in each case a bottle engaging member above an air chamber, said chamber being in communication with passages terminating in ports on the under bearing face of said carrier, said base having a grooved passageway on its upper bearing surface for cooperation with said ports, means for dividing said passageway into segments, compressed air supply connections, and three-way valves provided for certain of said segmental passageways for connecting the same at will into communication with said compressed air supply or to atmosphere.

19. A machine of the class described comprising a base, filler heads, pneumatically operated bottle supports, a carrier for said supports, means for rotating said carrier together with said heads and supports while maintaining said heads and supports respectively in alignment, means for bringing the bottle mouths into receiving contact with said heads, means for flowing a liquid into bottles upon said supports while said bottles are thus in engagement with said heads by means of a suction applied to the same, said bottle supports having in each case a bottle engaging member above an air chamber, said chamber being in communication with passages terminating in ports on the under bearing surface of said carrier, said base having a grooved passageway on its upper bearing surface for cooperation with said ports, means for dividing said passageway into segments, and means for variously connecting said segmental passages with a compressed air supply and to atmosphere to variously operate said bottle supports.

20. A machine of the class described comprising a base, filler heads, pneumatically operated bottle supports, a carrier for said supports, means for rotating said carrier together with said heads and supports while maintaining said heads and supports respectively in alignment, means for bringing the bottle mouths into receiving contact with said heads, means for flowing a liquid into bottles upon said supports while said bottles are thus in engagement with said heads by means of a suction applied to the same, said bottle supports having in each case a bottle engaging member above an air chamber, said chamber being in communication with passages terminating in ports on the under bearing surface of said carrier, said base having a grooved passageway on its upper bearing surface for cooperation with said supports, means for dividing said passageway into segments, compressed air supply connections, and three way valves provided for certain of said segmental passageways and operative to connect the same at will into communication with said compressed air supply or to atmosphere.

21. In combination, a base rotatable about a vertical axis, pneumatically operated bottle lifters positioned about said axis upon said rotary base, said base having a valve face on its under side provided with supply ports and associated passages for said lifters, a bearing member having an upper valve face bearing against said first mentioned valve face and supporting said rotary base, said bearing member having groove ports in its upper face positioned to register during rotation with said lifter ports, one of said groove ports being open to atmosphere, connections for supplying air under pressure to another of said groove ports, the different ports and pressures being provided for different operations of said lifters, each said lifter including an upright standard, a cylindrical lifting member having a closed end constituting the bottle support and a skirted portion fitting over said standard, suitable packing about the upper end of said standard engaging the interior of the cylindrical wall of said member, the corresponding air passage in said rotary base communicating with the interior of said member above said standard, a central stem extending downward from the closed end of said lifting members into a cylindrical opening in said standard, a spring around said stem acting to lower said lifting member when unrestrained by the air within said member, and a head at the lower end of said stem apertured for the passage of liquid in said cylindrical opening to delay the descent of said lifting member when air under pressure is removed therefrom.

22. In combination, a base rotatable about a vertical axis, pneumatically operated bottle lifters positioned about said axis upon said rotary base, said base having a valve face on its under side provided with supply ports and associated passages for said lifters, a bearing member having an upper valve face bearing against said first mentioned valve face and supporting said rotary base, said bearing member having groove ports in its upper face positioned to register during rotation with said lifter ports, one of said groove ports being open to atmosphere, connections for supplying air under pressure to another of said groove ports, the different ports and pressures being provided for different operations of said lifters, each said lifter including an upright standard, a cylindrical lifting member closely fitting over said standard with piston tightness, the corresponding air passage in said rotary base communicating with the interior of said lifting member, and dash pot means acting between said lifting member and standard to retard the return of said member to normal following its elevation by compressed air.

23. In combination, a rotary base having a compressed air supply passage therein, an upright standard supported thereby, a cylindrical lifting member having a closed end constituting the bottle support and a skirted portion fitting over said standard, suitable packing about the upper end of said standard engaging the interior of the cylindrical wall of said member, the air supply passage in said rotary base communicating with the interior of said member above said standard, a central stem extending downward from the closed end of said lifting member into a cylindrical opening in said standard, a spring around said stem acting to lower said lifting member when unrestrained by the air within said member, and a head at the lower end of said stem apertured for the passage of liquid in said cylindrical opening to delay the descent of said lifting member when air under pressure is removed therefrom.

24. In combination, a rotary base, an upright standard supported thereby, a cylindrical lifting member closely fitting over said standard with piston tightness, said rotary base having a compressed air supply passage communicating with the interior of said lifting member, means for controlling the supply of air to said passage, and dash pot means acting between said lifting member and standard to retard the return of said member to normal position following its elevation by compressed air.

25. A machine of the class described, comprising a base, bottle engaging heads, pneumatically operated bottle supports, a carrier for said supports, means for rotating said carrier together with said heads and supports while maintaining said heads and supports respectively in alignment, one head in alignment with each support, said bottle supports having in each case a bottle engaging member above an air chamber, said chamber being in communication with passages terminating in ports on the under bearing surface of said carrier, said base having a grooved passageway on its upper bearing surface for cooperation with said supports, means for dividing said passageway into segments, compressed air supply connections, and three way valves provided for certain of said segmental passageways and operative to connect the same at will into communication with said compressed air supply or to atmosphere.

26. A machine of the class described, comprising a base, bottle engaging heads, pneumatically operated bottle supports, a carrier for said supports, means for rotating said carrier together with said heads and supports while maintaining said heads and supports respectively in alignment, one head in alignment with each support, said bottle supports having in each case a bottle engaging member above an air chamber, said chamber being in communication with passages terminating in ports on the under bearing surface of said carrier, said base having a grooved passageway on its upper bearing surface for cooperation with said ports, means for dividing said passageway into segments, and means for variously connecting said segmental passages with a compressed air supply and to atmosphere to variously operate said bottle supports.

LEWIS E. FAGAN.
ALBERT B. MOJONNIER.